United States Patent
Arai et al.

(10) Patent No.: US 9,899,052 B2
(45) Date of Patent: Feb. 20, 2018

(54) RECORDING METHOD AND RECORDING DEVICE

(71) Applicants: Satoshi Arai, Shizuoka (JP); Yoshihiko Hotta, Shizuoka (JP); Kazuyuki Uetake, Shizuoka (JP); Ichiro Sawamura, Shizuoka (JP); Tomomi Ishimi, Shizuoka (JP); Yasuroh Yokota, Shizuoka (JP)

(72) Inventors: Satoshi Arai, Shizuoka (JP); Yoshihiko Hotta, Shizuoka (JP); Kazuyuki Uetake, Shizuoka (JP); Ichiro Sawamura, Shizuoka (JP); Tomomi Ishimi, Shizuoka (JP); Yasuroh Yokota, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/422,796

(22) Filed: Feb. 2, 2017

(65) Prior Publication Data
US 2017/0229143 A1 Aug. 10, 2017

(30) Foreign Application Priority Data

Feb. 5, 2016 (JP) .................................. 2016-021349
Jan. 27, 2017 (JP) .................................. 2017-013652

(51) Int. Cl.
*G11B 7/00* (2006.01)
*G11B 7/126* (2012.01)
(Continued)

(52) U.S. Cl.
CPC .......... *G11B 7/126* (2013.01); *G11B 7/00456* (2013.01); *G11B 7/127* (2013.01); *G11B 7/1384* (2013.01)

(58) Field of Classification Search
CPC ..... G11B 7/0903; G11B 7/1353; G11B 7/131; G11B 7/1205; G11B 7/0065; G11B 7/083;
(Continued)

(56) References Cited

U.S. PATENT DOCUMENTS 6,330,019 B1 * 12/2001 Kubokawa .................. B41J 2/46
347/241
8,248,905 B2 * 8/2012 Wang .................. G11B 7/00781
369/103
(Continued)

FOREIGN PATENT DOCUMENTS

JP 06-143807 5/1994
JP 07-186445 7/1995
(Continued)

OTHER PUBLICATIONS

European search report dated Jul. 28, 2017 in connection with corresponding European patent application No. 17154376.2.

*Primary Examiner* — Nabil Hindi
(74) *Attorney, Agent, or Firm* — Cooper & Dunham LLP

(57) ABSTRACT

A recording method including: emitting laser light from an optical fiber array to record an image formed of writing units with moving a recording target and the optical fiber array relatively using a recording device including a plurality of laser light-emitting elements and an emitting unit including the optical fiber array, in which a plurality of optical fibers configured to guide laser light emitted from the laser light-emitting elements are aligned, wherein a maximum length of the writing unit along a sub-scanning direction is controlled with set values of: a duty ratio and a cycle of a pulse signal input to the emitting unit; recording energy applied to the recording target; and a spot diameter of the laser light, to record with overlapping an edge of the writing unit with an edge of the adjacent writing unit in the sub-scanning direction.

18 Claims, 20 Drawing Sheets

(51) Int. Cl.
*G11B 7/0045* (2006.01)
*G11B 7/127* (2012.01)
*G11B 7/1384* (2012.01)

(58) Field of Classification Search
CPC .... G11B 7/00781; G02B 26/123; B41J 2/473; B41J 2/451; B41J 25/316; B41J 2/325
USPC ...... 369/120, 121, 44.37, 103; 347/241, 197
See application file for complete search history.

(56) References Cited

U.S. PATENT DOCUMENTS

| | | | | |
|---|---|---|---|---|
| 8,306,088 | B2* | 11/2012 | Volodin | G02B 27/0944 |
| | | | | 372/102 |
| 8,553,056 | B2* | 10/2013 | Hanabusa | B41J 2/45 |
| | | | | 347/197 |
| 2002/0012153 | A1 | 1/2002 | Sunagawa | |

FOREIGN PATENT DOCUMENTS

| | | |
|---|---|---|
| JP | 2004-001264 | 1/2004 |
| JP | 2010-052350 | 3/2010 |

* cited by examiner

RECORDING METHOD AND RECORDING DEVICE

CROSS-REFERENCE TO RELATED APPLICATIONS

The present application claims priority under 35 U.S.C. § 119 to Japanese Patent Application No. 2016-021349, filed Feb. 5, 2016 and Japanese Patent Application No. 2017-013652, filed Jan. 27, 2017. The contents of which are incorporated herein by reference in their entirety.

BACKGROUND OF THE INVENTION

Field of the Invention

The present disclosure relates to a recording method and a recording device.

Description of the Related Art

As a recording method for performing recording on thermosensitive recording media with a change in hue or reflectance caused by heating, for example, contact recording methods, such as use of heat stamps or thermal heads, have been generally known. Among the above-mentioned examples, thermal heads have been most commonly used.

In a recording method using the thermal head, the thermal head is pressed against a thermosensitive recording medium in order to achieve sufficient heat conductivity. Therefore, print missing occurs due to deterioration of a surface of a thermal head caused by dirt or foreign matter deposited on a surface of the thermosensitive recording medium. As a result, maintenance or replacement of the thermal head may be required.

Meanwhile, as method for recording in non-contact manner, there are recording methods using laser. As the recording methods using laser, typical is a method where one laser beam is scanned by a galvanometer mirror to perform recording. The above-described recording method however has a problem that a recording time is prolonged, as a quantity of information of an image increases. In order to solve the problem, for example, proposed is an image-replacement method where a reversible thermosensitive recording medium is exposed to a laser beam set to satisfy the desired relationship using a laser array exposure unit, in which a plurality of lasers each independently driven are aligned in a direction orthogonal to a moving direction of the reversible thermosensitive recording medium (see, for example, Japanese Unexamined Patent Application Publication No. 2010-52350).

SUMMARY OF THE INVENTION

According to one aspect of the present disclosure, a recording method includes emitting laser light from an optical fiber array to record an image formed of writing units with moving a recording target and the optical fiber array relatively using a recording device. The recording device includes a plurality of laser light-emitting elements and an emitting unit including the optical fiber array, in which a plurality of optical fibers configured to guide laser light emitted from the laser light-emitting elements are aligned. A maximum length of the writing unit along a sub-scanning direction is controlled with set values of a duty ratio and a cycle of a pulse signal input to the emitting unit; recording energy applied to the recording target; and a spot diameter of the laser light, to record with overlapping, in the sub-scanning direction, an edge of the writing unit with an edge of the adjacent writing unit in the sub-scanning direction.

DESCRIPTION OF THE EMBODIMENTS (Recording Method and Recording Device)

A recording method of the present disclosure includes emitting laser light from an optical fiber array to record an image formed of writing units with moving a recording target and the optical fiber array relatively using a recording device. The recording device includes a plurality of laser light-emitting elements and an emitting unit including the optical fiber array, in which a plurality of optical fibers configured to guide laser light emitted from the laser light-emitting elements are aligned.

A maximum length of the writing unit along the sub-scanning direction is controlled with set values of a duty ratio and a cycle of a pulse signal input to the emitting unit; recording energy applied to the recording target; and a spot diameter of the laser light, to record with overlapping an edge of the writing unit with an edge of the adjacent writing unit in the sub-scanning direction.

A recording device of the present disclosure includes a plurality of laser light-emitting elements and an emitting unit including an optical fiber array, in which a plurality of optical fibers configured to guide laser light emitted from the laser light-emitting elements are aligned. The recording device is configured to apply laser light emitted from the optical fiber array with moving a recording target and the optical fiber array relatively, to record an image formed of writing units.

A maximum length of the writing unit along the sub-scanning direction is controlled with set values of a duty ratio and a cycle of a pulse signal input to the emitting unit; recording energy applied to the recording target; and a spot diameter of the laser light, to record with overlapping an edge of the writing unit with an edge of the adjacent writing unit in the sub-scanning direction.

Figure 5A:
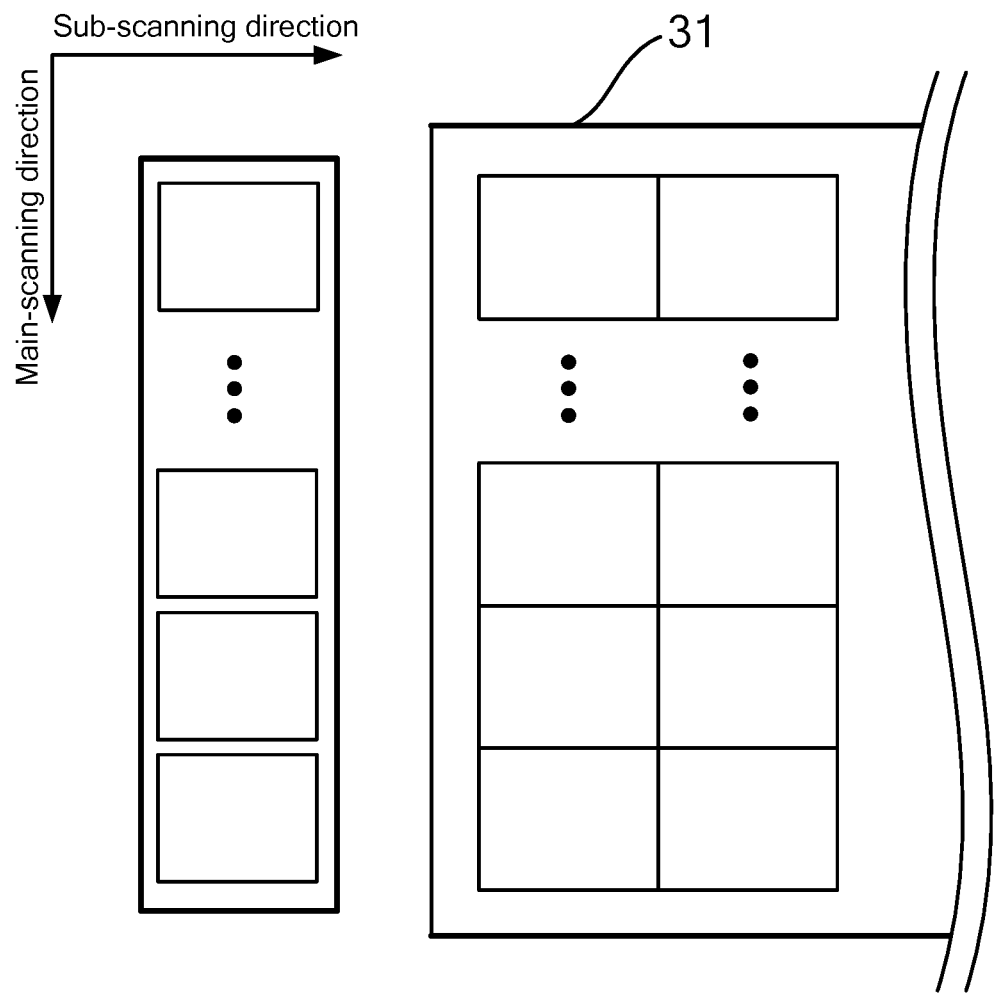
FIG. 5A is a schematic view illustrating one example of a recording method of a solid image with a pulse control using a thermal head known in the art.
Figure 5B:
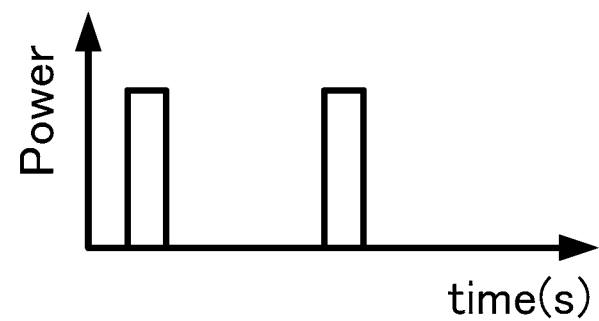
FIG. 5B is a graph depicting a relationship between time and power in FIG. 5A.

As illustrated in FIG. 5, energy control of a thermal head that has been generally used in the art is performed with pulse control in view of easiness of control. Even in the case where a thermal head is continuously heated, such as when a solid image is formed, the energy is controlled by decreasing a duty ratio of a pulse signal, not to elongate an intentional image due to accumulated heat in the thermal head.

Figure 6A:
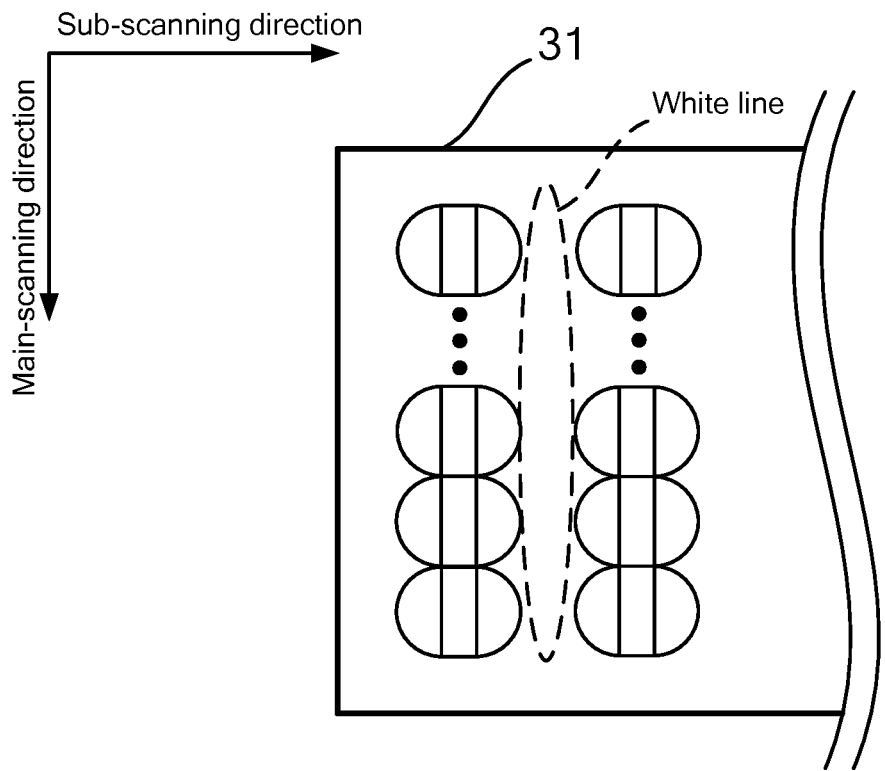
FIG. 6A is a schematic view illustrating a recording method with a pulse control using an optical fiber array based on the pulse signal of FIGS. 5A and 5B.
Figure 6B:
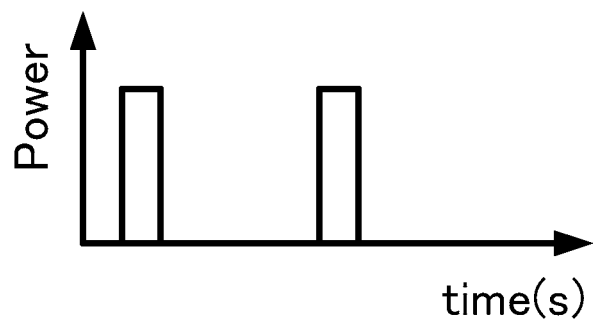
FIG. 6B is a graph depicting a relationship between time and power in FIG. 6A.

The recording device and recording method of the present disclosure are based on the following findings. As illustrated in FIGS. 6A and 6B, when the laser device disclosed in Japanese Unexamined Patent Application Publication No. 2010-52350 is controlled by a pulse signal used for a thermal head that has been generally used in the art, the writing unit recorded with the laser light may be short because the duty ratio is small. Therefore, a blank space (white line) is formed in an image every cycle of the pulse signal. As a result, readability of barcodes or visibility of letters may be degraded.

The recording method and recording device of the present disclosure are based on the following findings. According to the method disclosed in Japanese Unexamined Patent Application Publication No. 2010-52350, a laser is always oscillated when recording is continuously performed by setting a duty ratio of the pulse signal to 1.0 in order not to form white lines. Therefore, the emitting unit etc. are significantly heated and it is difficult to cool the emitting unit down to thereby vary irradiation energy of the laser light. Accordingly, an image cannot be stably recorded.

The present disclosure has an object to provide a recording method, which can record a high-resolution image without occurrences of white line defects, as well as suppressing generation of heat from a laser device.

The present disclosure can provide a recording method, which can record a high-resolution image without occurrences of white line defects, as well as suppressing generation of heat from a laser device.

There are two scanning directions of the laser light, a main-scanning direction and a sub-scanning direction. The main-scanning direction and the sub-scanning direction are orthogonal to each other.

The main-scanning direction is a direction along which a plurality of the optical fibers are aligned.

The sub-scanning direction is a direction along which the recording target is moved relative to the optical fiber array.

Since an image is recorded on the recording target by moving the recording target relative to the optical fiber array, the optical fiber array may travel relatively to recording target, or the recording target may travel relative to the optical fiber array.

As a principle of image formation, heat is generated in a center portion of a region irradiated with laser while scanning, and the recording target is heated by thermal diffusion of the heated portion to thereby form an image.

A method for coloring a designated region without linear blank spaces include (1) a method where laser light is applied without any gap, and (2) a method where a designated region is heated to a certain temperature or higher through thermal diffusion by locally applying high pulsed energy. In case of the (2), defects, such as deformation and white blank portions, are caused in an area where a temperature is excessively increased, because the heated portion cannot be uniformly heated. According to the (1) of the present disclosure, uniform coloring can be achieved and deformations can be prevented, and therefore the (1) is preferable.

A relationship between the writing units and set values of a cycle and duty ratio of the pulse signal input to the emitting unit is described with reference to FIGS. 7A to 7D.

Figure 7A:
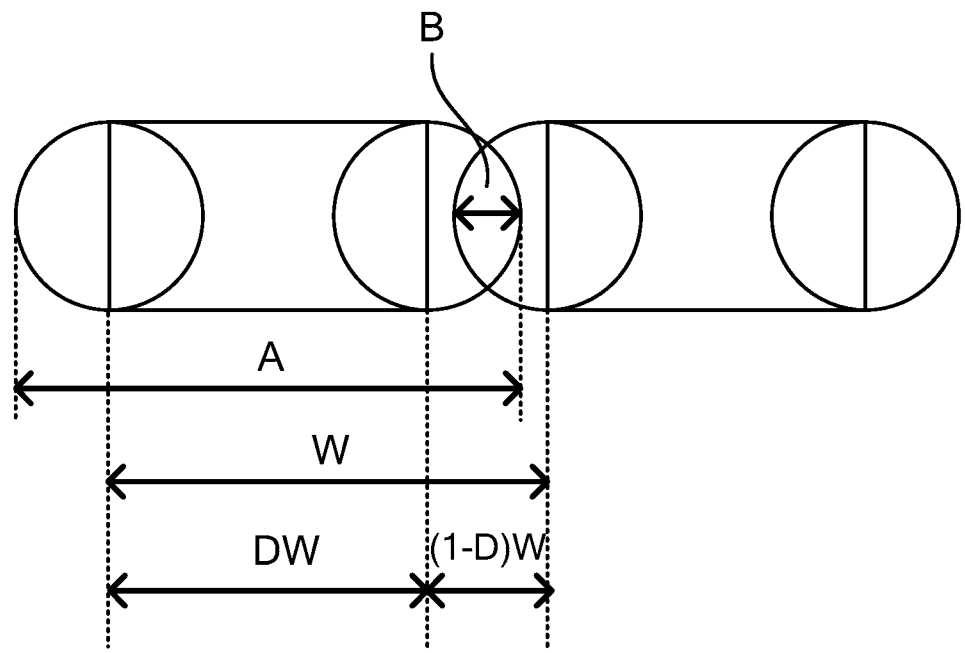
FIG. 7A is a schematic view illustrating a recording method of writing units with a pulse control according to the present disclosure.
Figure 7B:
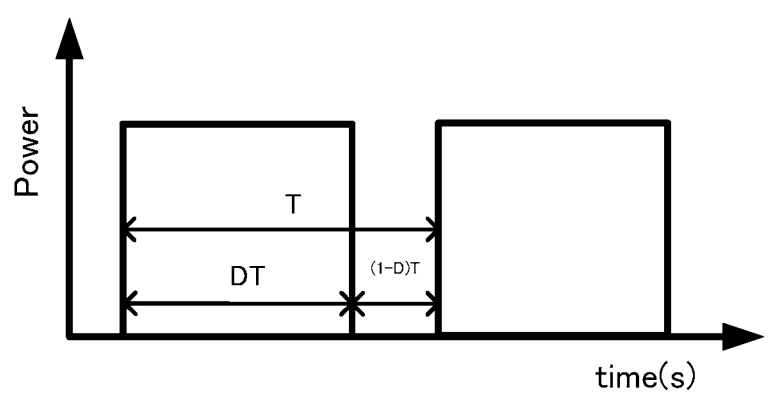
FIG. 7B is a graph depicting a relationship between time and power in FIG. 7A.
Figure 7C:
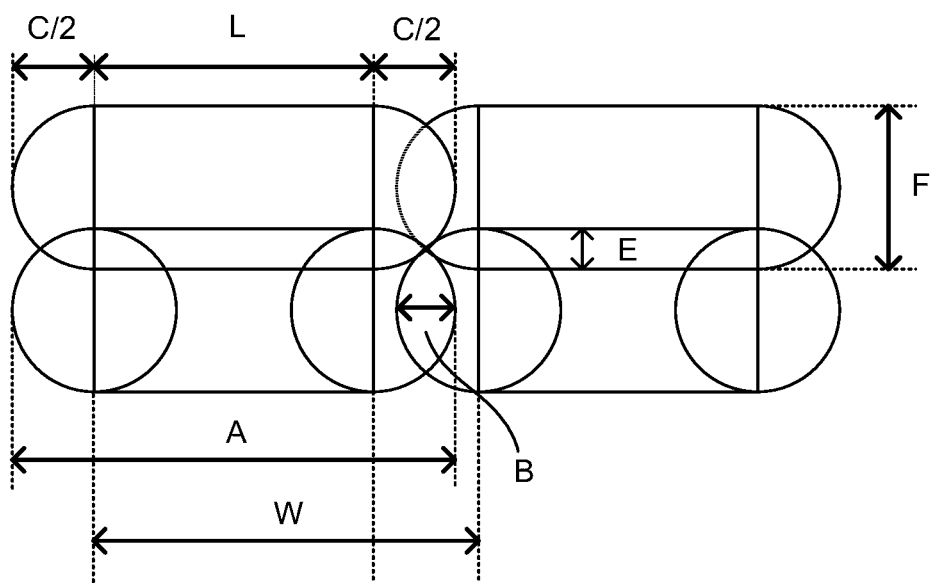
FIG. 7C is a schematic view illustrating a recording method of writing units with a pulse control according to the present disclosure.
Figure 7D:
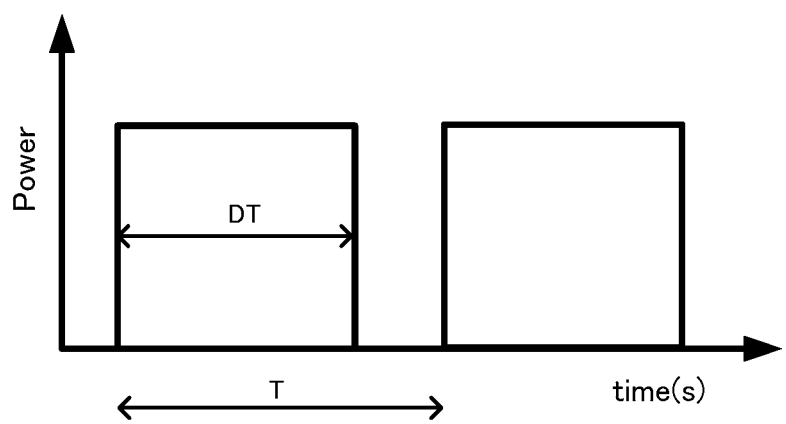
FIG. 7D is a graph depicting a relationship between time and power in FIG. 7C.

FIGS. 7A and 7C are schematic views each illustrating a recording method of writing units with a pulse control according to the present disclosure, and depict that the writing units illustrated in FIGS. 7A and 7C are respectively recorded based on the pulse signals illustrated in FIGS. 7B and 7D.

In FIGS. 7A and 7C, A is a maximum length of the writing unit along a sub-scanning direction, B is a maximum overlapped length of the adjacent writing units along the sub-scanning direction, D is a duty ratio of the pulse signal, T is a cycle of the pulse signal, L is a distance along which the laser light is applied to write the writing unit, C is a maximum length of a swell of the writing unit in the sub-scanning direction relative to the distance L along which the laser light is applied, and W is a gap between positions at which irradiation of the laser light is started for writing two adjacent writing units in the sub-scanning direction.

The maximum length A of the writing unit along the sub-scanning direction can be measured by means of a microdensitometer (PDM-7, available from KONICA MINOLTA, INC.). Specifically, image density is measured by a microdensitometer (slit width: 5 μm), and an average density is calculated from the maximum value and minimum value from the measured density values. An outline of the average density is determined, and the maximum length A is determined by magnifying at 500 times. In the same manner, the length W can be determined.

The distance L along which the laser light is applied to write the writing unit can be determined as a distance from the time from when an output signal is turned on from a laser device until the output signal is turned off, and a speed for moving the recording target, and can be determined by multiplying a moving speed Vs of the recording target relative to the optical fiber array in the sub-scanning direction with a pulse width DT obtained by integration of time T for one cycle of the pulse signal and a duty ratio D of the pulse signal.

The maximum length C of the swell of the writing unit relative to the distance L along with the laser light is applied in the sub-scanning direction is a length obtained by deducting the distance L along which the laser light is applied to write the writing unit from the maximum length A of the writing unit in the sub-scanning direction.

The gap W between positions at which irradiation of the laser light is started to write two adjacent writing units in the sub-scanning direction can be determined as a distance from a speed for moving the recording target during the time T for one cycle of the pulse signal until the following adjacent writing unit is written. The gap W is a pulse cycle length of a writing unit prepared by multiplying a moving speed Vs of the recording target relative to the optical fiber array in the sub-scanning direction with time T for one cycle of the pulse signal.

The timing for turning on or off the laser irradiation or one cycle of the following writing unit adjacent to the previous unit can be measured by means of an oscilloscope.

The writing units constituting the image preferably satisfy a relationship represented by Mathematical Formula 1 below.

$$0 < C - (1-D)T \cdot Vs \qquad \text{Mathematical Formula 1}$$

When Mathematical Formula 1 is satisfied, the writing units adjacent to each other in the sub-scanning direction are overlapped, and a continuous recording image can be obtained. When $0 \geq C - (1-D)T \cdot Vs$ is satisfied, the writing units adjacent to each other in the sub-scanning direction are not overlapped, and a white line is formed between the writing units.

The writing units constituting the image preferably satisfy a relationship represented by Mathematical Formula 2 below, and more preferably satisfy a relationship represented by Mathematical Formula 5 below.

$$0.1 < 1 - (1-D)T \cdot Vs/C < 0.9 \qquad \text{Mathematical Formula 2}$$

$$0.15 < 1 - (1-D)T \cdot Vs/C < 0.8 \qquad \text{Mathematical Formula 5}$$

In Mathematical Formula 2, $1-(1-D)T \cdot Vs/C$ is a ratio of the overlapping of the adjacent writing units relative to the swell of the writing unit in the sub-scanning direction.

When the following formula $1-(1-D)T \cdot Vs/C \leq 0.1$ is satisfied, the overlapped area of the writing units is small, and therefore an image width of the overlapped area of the adjacent two writing units in the main-scanning direction is thin to form a dent toward the main-scanning direction in the linear image along the sub-scanning direction. In order to prevent the dent to form a white blank image, a width of the writing unit in the main-scanning direction is increased, and therefore it is necessary to increase an overlapped area of the writing units in the main-scanning direction. Since the width of the writing unit in the main-scanning direction is widened, image resolution decreases. When the following formula $1-(1-D)T \cdot Vs/C \geq 0.9$ is satisfied, the laser-turned-off time (1−D)T is short and heat control cannot be performed sufficiently, although the overlapped area of the writing unit in the sub-scanning direction is large and a dent formed in a linear image is less likely observed.

The overlapping width E of the writing units in the main-scanning direction and the width F of the writing unit in the main-scanning direction can be determined from an image, in which two or more writing units adjacent to each other are overlapped in the main-scanning direction. Moreover, the writing pitch P of the writing units in the main-scanning direction can be determined by measuring gap between peak positions of swells of writing units in the main-scanning direction. In the case where three or more writing units are present adjacent to each other, an average value of gaps between the peaks in the main-scanning direction is determined, and the average value is preferably determined as the writing pitch P.

Next, a width of an image in the main-scanning direction is measured. In the image, two or more writing units adjacent to each other are overlapped in the main-scanning direction. From the value of the width, a value obtained by multiplying the writing pitch P of the writing units in the main-scanning direction with the number of the writing units was deducted to determine an overlapped width E of the writing units in the main-scanning direction. Moreover, the overlapped width E of the writing units in the main-scanning direction is added with the pitch width P to determine the width F of the writing units in the main-scanning direction.

The width F of the writing units in the main-scanning direction can be determined from an image, in which two or more writing units adjacent to each other are overlapped. A gap of peak positions of the swells of each writing unit in the main-scanning direction is measured to determine a drawing pitch of the writing units in the main-scanning direction. In the case where three or more writing units are present adjacent to each other, an average value of the gaps of the peaks in the main-scanning direction is obtained, and is determined as a drawing pitch P of the writing units in the main-scanning direction.

Next, a width of an image in the main-scanning direction is measured, where the image include two or more writing units adjacent to each other in the main-scanning direction, which are overlapped in the main-scanning direction. From the measured value, a value obtained by multiplying the drawing pitch P of the writing units in the main-scanning direction with the number of the writing units is deducted to thereby determine an overlapped width E of the writing units in the main-scanning direction. Moreover, the overlapped width E of the writing units in the main-scanning direction is added with the pitch width P to thereby determine the width F of the writing unit in the main-scanning direction.

The width F of the writing unit in the main-scanning direction and the maximum length C of the swell of the writing unit in the sub-scanning direction can be controlled with set values of recording energy of the laser light applied to the recording target, and a spot diameter of the laser light. When the recording energy of the laser light applied to the recording target is increased, the width F of the writing unit in the main-scanning direction and the maximum length C of the swell of the writing unit in the sub-scanning direction are increased. As long as the recording energy of the laser light is sufficient to color the recording target, moreover, the width F of the writing unit in the main-scanning direction and the maximum length C of the swell of the writing unit in the sub-scanning direction are increased, when the spot diameter is increased. When the recording energy of the laser light is insufficient to color the recording target, on the other hand, the width F of the writing unit in the main-scanning direction and the maximum length C of the swell of the writing unit in the sub-scanning direction may be decreased, when the spot diameter is increased.

The writing units constituting the image preferably satisfy a relationship represented by Mathematical Formula 3 below.

$$0.95 \cdot F \cdot (2 \times (1-(1-D)T \cdot Vs/C) - (1-(1-D)T \cdot Vs/C)^2)^{1/2} \geq P \qquad \text{Mathematical Formula 3}$$

In Mathematical Formula 3, P is a recording pitch of the writing units in a main-scanning direction, F is a width of the writing unit in the main-scanning direction, and D, T, Vs, and C are identical to D, T, Vs, and C of Mathematical Formula 1.

When the following formula $0.95 \cdot F \cdot (2 \times (1-(1-D)T \cdot Vs/C) - (1-(1-D)T \cdot Vs/C)^2)^{1/2}$ is smaller than P, a white gap, which is an area not illustrated, in the shape of a star may be formed in an image between line images adjacent to each other in the main-scanning direction, an image density or visibility may be degraded. Therefore, the width F of the writing unit in the main-scanning direction is controlled by a spot diameter of the laser light, or energy of the laser light, or both, and the writing units are controlled to make the formula above P or greater by adjusting the spot diameter, a duty ratio D, or pulse cycle T, or any combination of the foregoing conditions. As a result, formation of a white gap, which is an area not illustrated, in the shape of a star can be prevented, and an image having a high image density and excellent visibility can be obtained.

Figure 8:
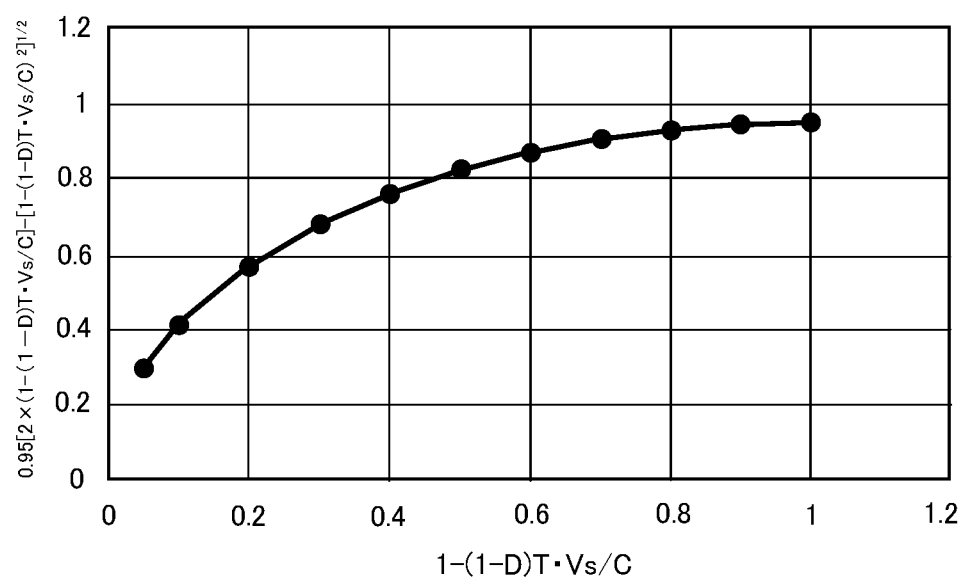
FIG. 8 is a graph associated with Mathematical Formula 3 in the present disclosure.

Moreover, FIG. 8 depicts a graph, where a vertical axis is the following formula $0.95(2 \times (1-(1-D)T \cdot Vs/C) - (1-(1-D)T \cdot Vs/C)^2)^{1/2}$ when F is 1 in Mathematical Formula 3, and a horizontal axis is the following formula $1-(1-D)T \cdot Vs/C$, namely, B/C.

The writing units constituting the image preferably satisfy a relationship represented by Mathematical Formula 4 below.

$$Vs \cdot DT + C \leq 3F \qquad \text{Mathematical Formula 4}$$

In Mathematical Formula 4, $Vs \cdot DT + C$ represents a maximum length of the writing unit in the sub-scanning direction. When the maximum length of the writing unit in the sub-scanning direction is larger than 3F relative to the image width F in the main-scanning direction, the writing unit becomes long in the sub-scanning direction. Therefore, a ratio of the time for turning laser off becomes short, and therefore heat control cannot be sufficiently performed.

<Duty Ratio of Pulse Signal>

A duty ratio of a pulse signal to write the writing unit constituting the image is preferably 0.95 or less, more preferably 0.90 or less, and particularly preferably 0.80 or less. When the duty ratio is 0.95 or less, the laser-on time DT is short, and generation of heat of the emitting unit can be prevented, and therefore such a duty ratio is preferable.

A duty ratio of the pulse signal of a first cycle at the start of recording is preferably larger than a duty ratio of the pulse signal of second or later cycle, and the duty ratio of the pulse signal of the first cycle is more preferably 105% or greater but 125% or less relative to the duty ratio of the pulse signal of the second cycle. When the duty ratio of the pulse signal of the first cycle at the start of the recording is larger than the duty ratio of the pulse signal of the second or later cycle, reduction in recording density of the writing unit at the start of the recording can be prevented and therefore such a duty ratio advantageous.

FIGS. 9A to 9J are schematic views illustrating examples of an overlapping state of writing units, and depict writing units illustrated in FIGS. 9A, 9C, 9E, 9G, and 9I are recorded based on pulse signals illustrated in FIGS. 9B, 9D, 9F, 9H, and 9J, respectively.

FIGS. 9A to 9J depict a relationship between the pulse signal and the writing units recorded based on the pulse signal, when a width of the writing units in the main-scanning direction and a length W of a pulse cycle are set constant, and a duty ratio D is changed to 0.3, 0.5, 0.7, 0.75, and 1.0.

As illustrated in FIGS. 9A to 9J, it is difficult to overlap adjacent writing units in the sub-scanning direction, when the duty ratio D is small, and writing units adjacent to each other are easily overlapped in the sub-scanning direction when the duty ratio D is large.

<Cycle of Pulse Signal>

Figure 9A:
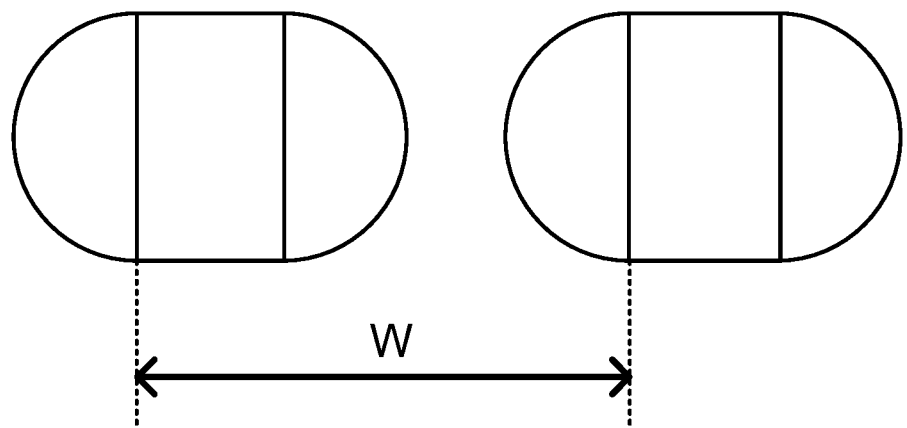
FIG. 9A is a schematic view illustrating one example of an overlapping state of writing units.
Figure 9B:
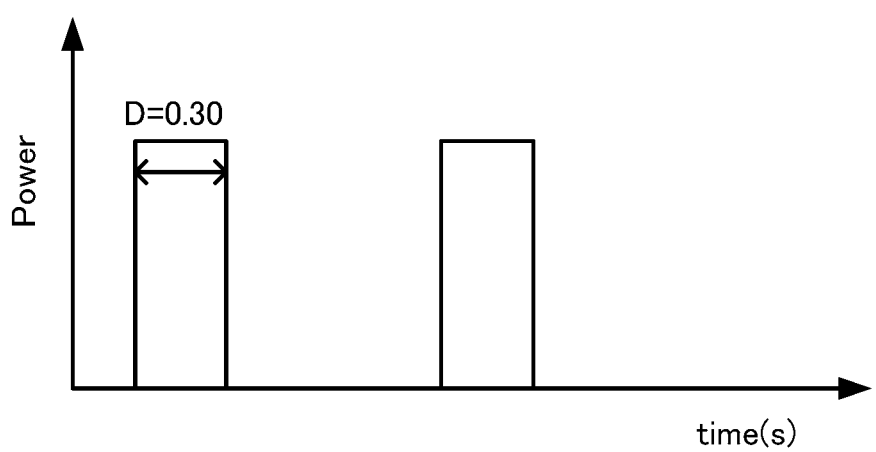
FIG. 9B is a graph depicting a relationship between time and power in FIG. 9A.
Figure 9C:
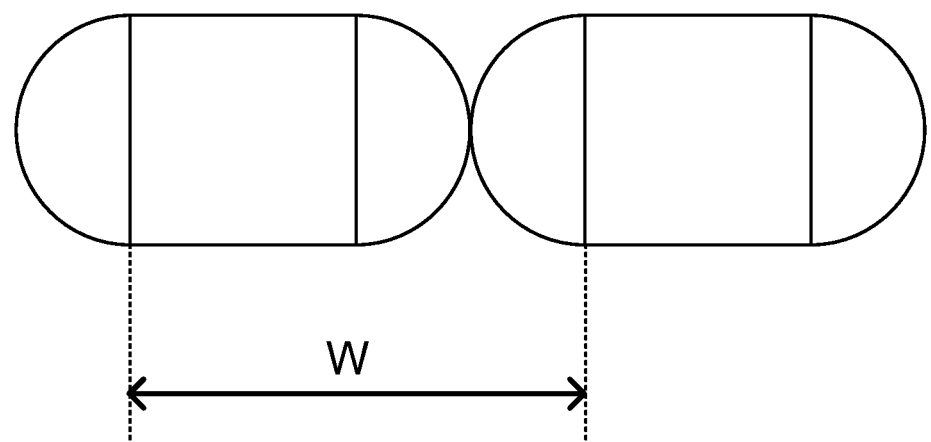
FIG. 9C is a schematic view illustrating one example of an overlapping state of writing units.
Figure 9D:
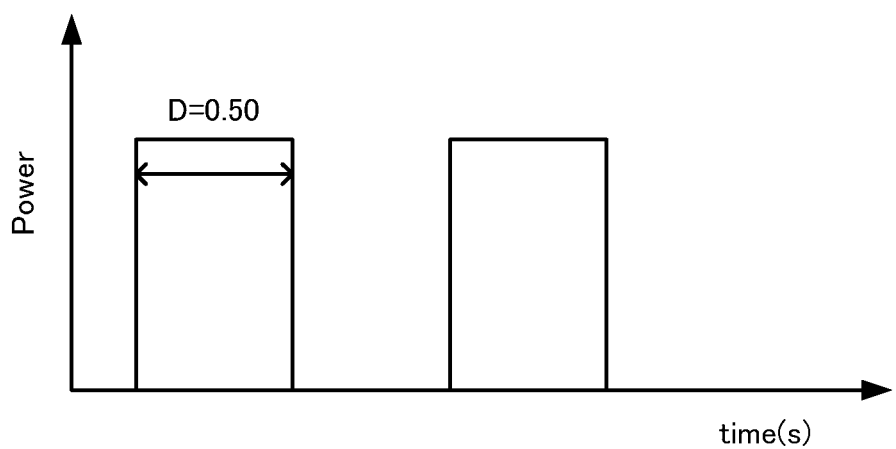
FIG. 9D is a graph depicting a relationship between time and power in FIG. 9C.
Figure 9E:
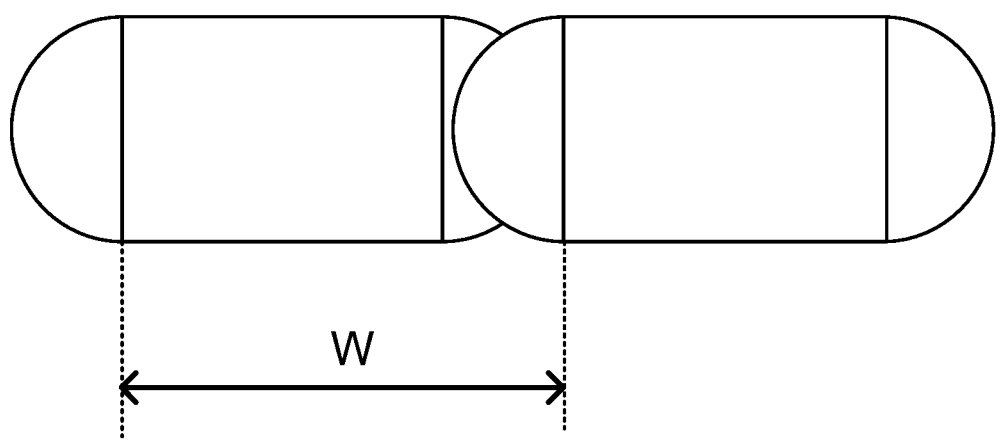
FIG. 9E is a schematic view illustrating one example of an overlapping state of writing units.
Figure 9F:
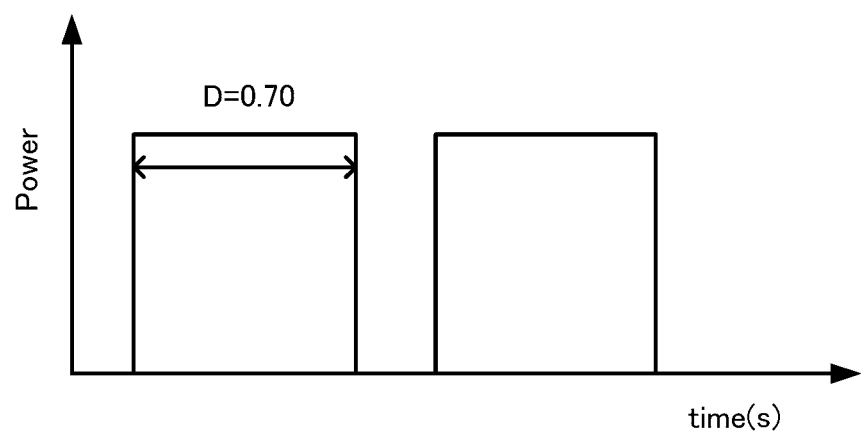
FIG. 9F is a graph depicting a relationship between time and power in FIG. 9E.
Figure 9G:
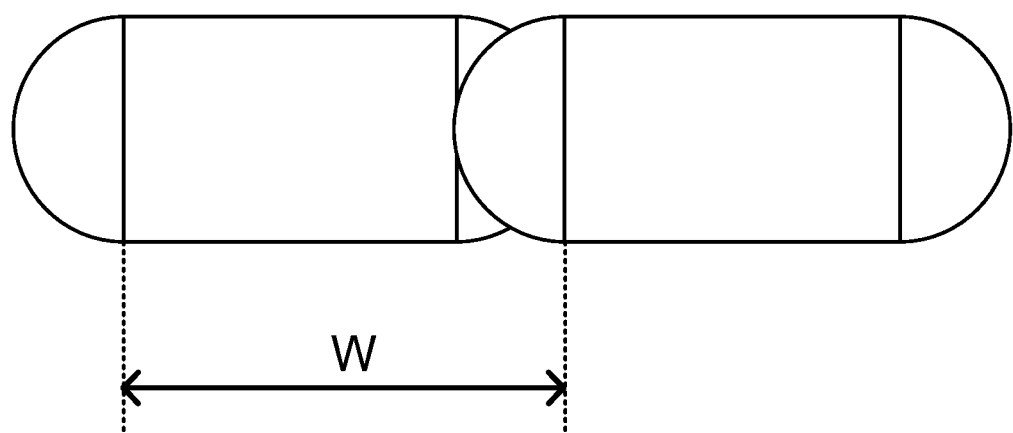
FIG. 9G is a schematic view illustrating one example of an overlapping state of writing units.
Figure 9H:
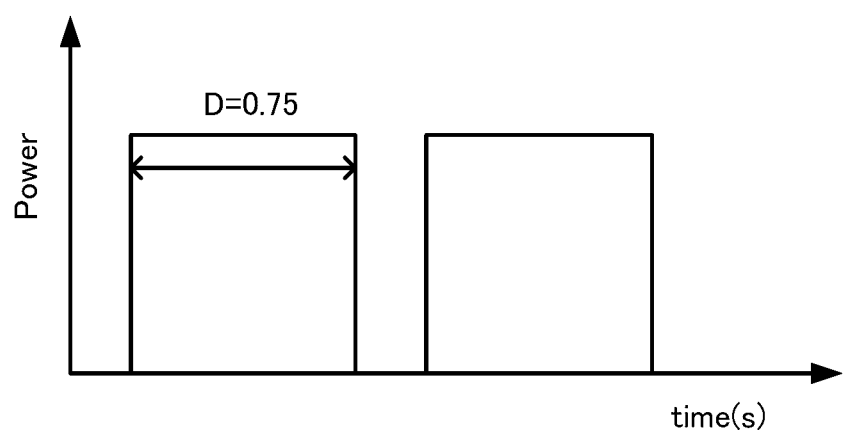
FIG. 9H is a graph depicting a relationship between time and power in FIG. 9G.
Figure 9I:
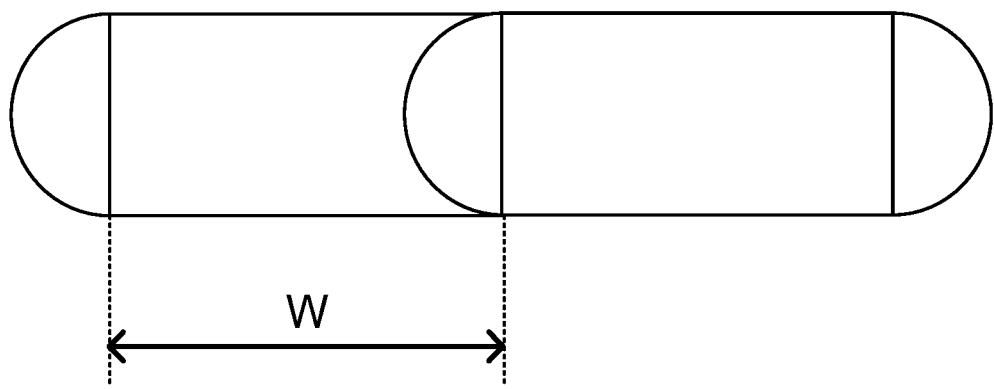
FIG. 9I is a schematic view illustrating one example of an overlapping state of writing units.
Figure 9J:
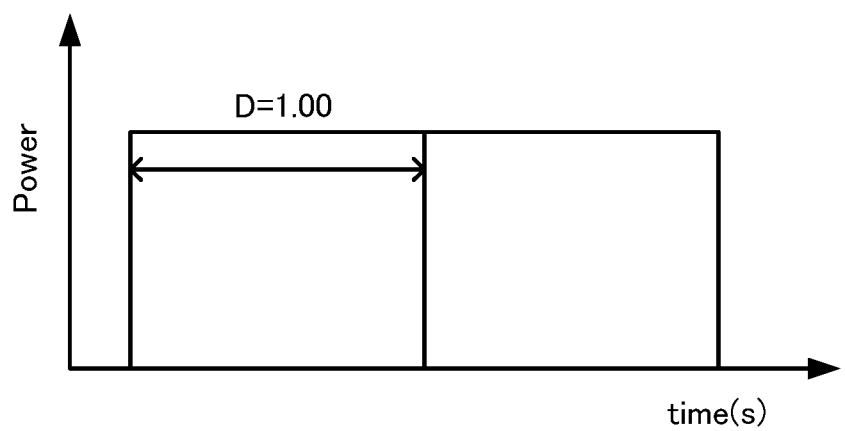
FIG. 9J is a graph depicting a relationship between time and power in FIG. 9I.
Figure 10A:
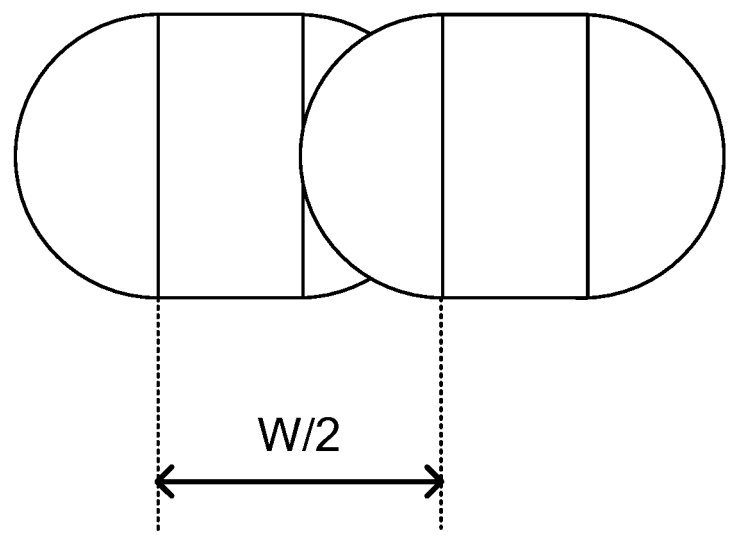
FIG. 10A is a schematic view illustrating one example of an overlapping state of writing units.
Figure 10B:
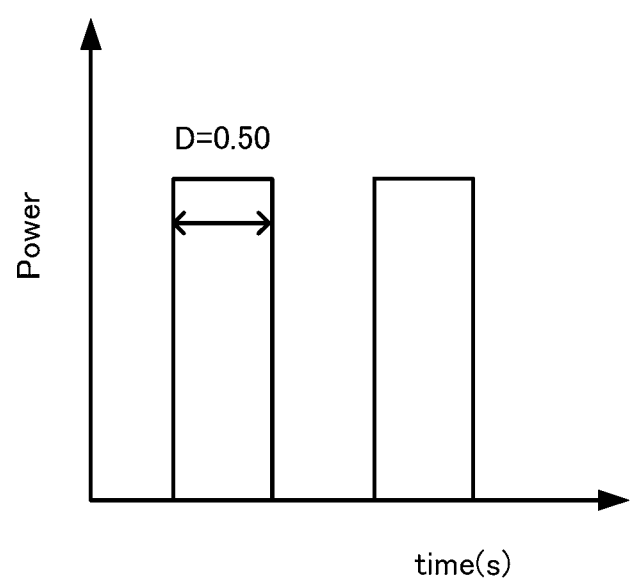
FIG. 10B is a graph depicting a relationship between time and power in FIG. 10A.
Figure 10C:
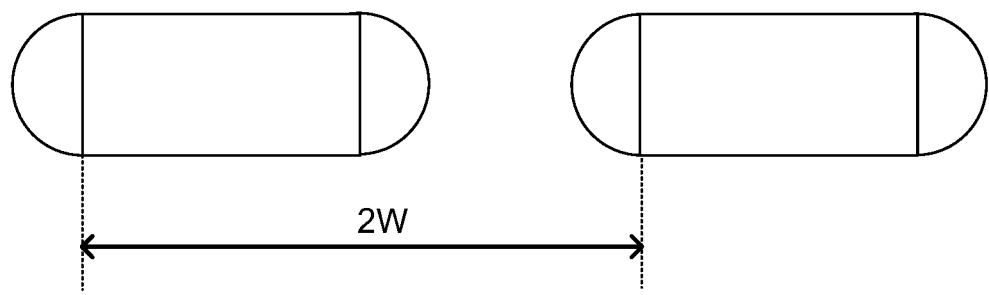
FIG. 10C is a schematic view illustrating one example of an overlapping state of writing units.
Figure 10D:
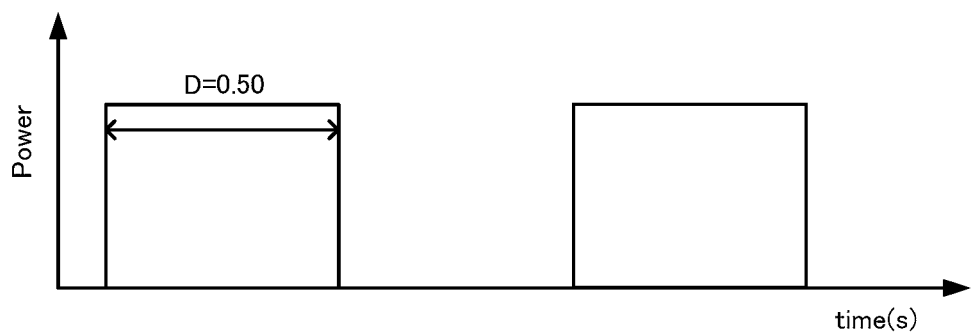
FIG. 10D is a graph depicting a relationship between time and power in FIG. 10C.
Figure 11A:
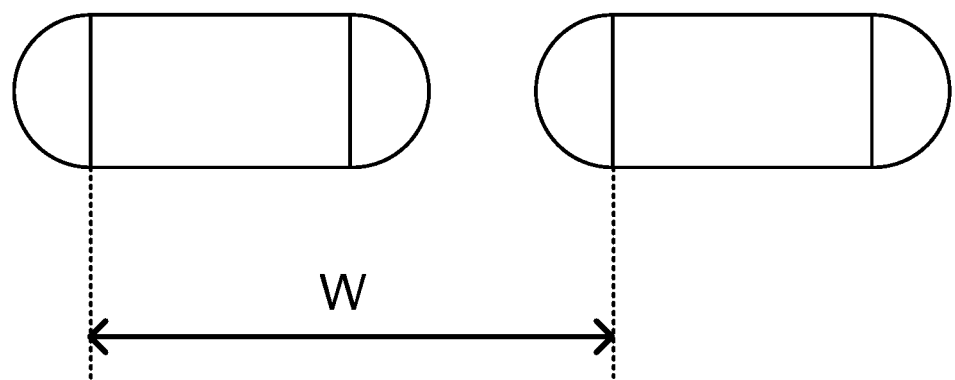
FIG. 11A is a schematic view illustrating one example of an overlapping state of writing units.
Figure 11B:
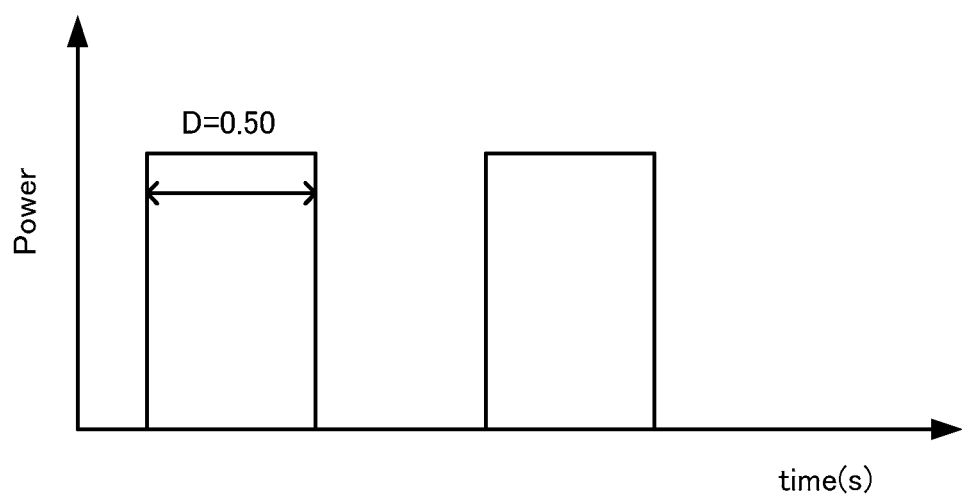
FIG. 11B is a graph depicting a relationship between time and power in FIG. 11A.
Figure 11C:
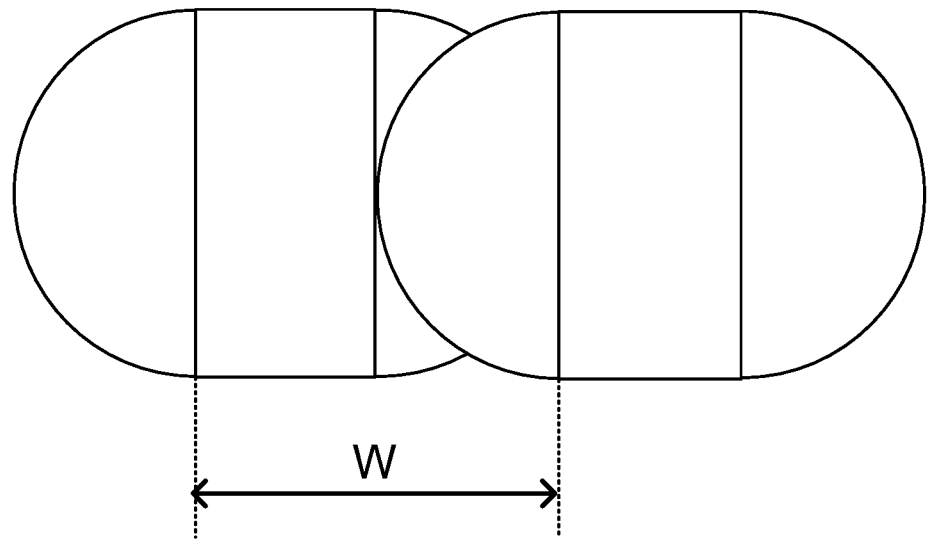
FIG. 11C is a schematic view illustrating one example of an overlapping state of writing units.
Figure 11D:
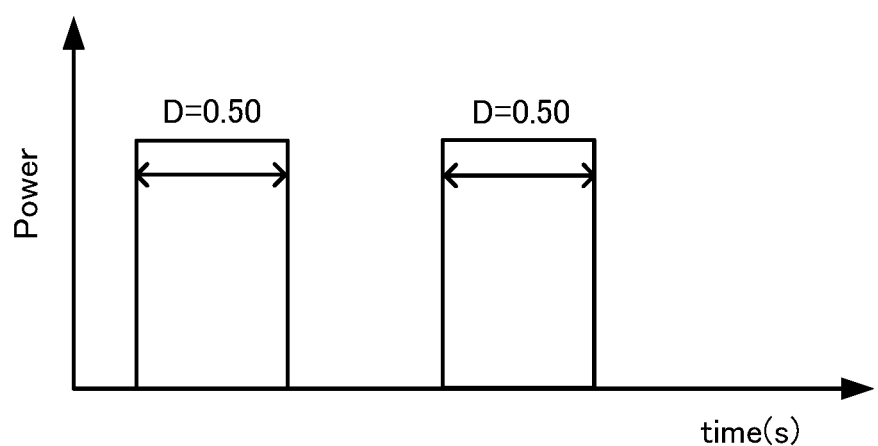
FIG. 11D is a graph depicting a relationship between time and power in FIG. 11C.

FIGS. 10A to 10D are schematic views illustrating examples of an overlapping state of writing units, and are identical to FIGS. 9C and 9D, except that the cycle T of the pulse signal is changed to T/2 and 2T, namely, the length W of the pulse cycle of the writing units is changed to W/2 and 2W.

As illustrated in FIGS. 10A to 10D and 9C and 9D, writing units adjacent to each other in the sub-scanning direction are easily overlapped, when the length W of the pulse cycle is short, and it is difficult to overlap the writing units when the length W of the pulse cycle is long.

<Spot Diameter of Laser Light>

A spot diameter of the laser light is not particularly limited and may be appropriately selected depending on the intended purpose.

For example, the spot diameter can be measured by means of a beam profiler.

FIGS. 11A to 11D are schematic views illustrating writing units adjacent to each other recorded when, in FIGS. 9C and 9D, the pulse cycle width W and the duty ratio D are made constant, and the width of the writing units in the main-scanning direction is changed. FIGS. 11A to 11D are identical to FIGS. 9C and 9D, except that the width of the writing units in the main-scanning direction is made ½, and 2 times.

As illustrated in FIGS. 11A to 11D and 9C and 9D, it is difficult to overlap the writing units adjacent to each other in the sub-scanning direction, when the width of the writing units in the main-scanning direction is small, and the writing units adjacent to each other in the sub-scanning direction are easily overlapped to each other when the width of the writing units in the main-scanning direction is large.

It can be understood from FIGS. 9A to 9J, 10A to 10D, and 11A to 11D that the maximum length of the writing unit in the sub-scanning direction is controlled with set values of the duty ratio and cycle of the pulse signal input to the emitting unit, and the spot diameter of the laser light applied to the recording target, and therefore recording can be performed by overlapping an edge of the writing unit to the adjacent writing unit in the sub-scanning direction.

In the present disclosure, a method for recording an image on a recording target using the recording device including an optical fiber array, in which a plurality of optical fibers each independently driven are aligned in a main-scanning direction orthogonal to a sub-scanning direction that is a moving direction of the recording target, is not particularly limited and may be appropriately selected depending on the intended purpose. Examples of the method include: a method where a light distribution of a certain direction (e.g., a sub-scanning direction) is narrowed by modifying a shape of a lens; a method using a beam splitter; and a method using optical fibers each core shape of which is other than circle (e.g., a polygonal-core optical fiber (Top Hat Fiber (registered trademark) available from Mitsubishi Cable Industries, Ltd.).

<Image>

The image is not particularly limited and may be appropriately selected depending on the intended purpose, as long as the image is visually recognizable information. Examples of the image include letters, symbols, lines, figures, solid images, combinations of any of the foregoing images, QR codes (registered trademark), barcodes, and two-dimensional codes.

<Recording Target>

The recording target is not particularly limited and may be appropriately selected depending on the intended purpose, as long as the recording target is an object that absorbs light and converts the light into heat to form an image. Examples of the recording target include thermosensitive recording media, structures each including a thermosensitive recording area, and laser marking, such as engraving to metal. Among the above-listed examples, a thermosensitive recording medium and a structure including a thermosensitive recording area are preferable.

Examples of the thermosensitive recording area include an area of a surface of a structure, to which a thermosensitive recording label is bonded, and an area of a surface of a structure, which is coated with a thermosensitive recording material.

The structure including a thermosensitive recording area is not particularly limited and may be appropriately selected depending on the intended purpose, as long as the structure including a thermosensitive recording area includes the thermosensitive recording area on a surface of the structure. Examples of the structure include: various products, such as plastic bags, PET bottles, and tins; transportation containers, such as cardboard boxes and shipping containers; products in process; and industrial products.

—Thermosensitive Recording Medium—

As the thermosensitive recording medium, a thermosensitive recording medium, to which image recording is performed once, is suitably used. Note that, a thermoreversible recording medium, to which image recording and image erasing are repetitively performed, can be also used as the thermosensitive recording medium.

The thermosensitive recording medium includes a support and a thermosensitive coloring layer on the support, and may further include other layers according to the necessity. Each of the above-mentioned layers may have a single-layer structure or a laminate structure, and may be disposed on the other surface of the support.

—Thermosensitive Coloring Layer—

The thermosensitive coloring layer includes a material that absorbs laser light and converts the laser light into heat (photothermal conversion material) and a material that causes a change in hue or reflectance with heat, and may further include other ingredients according to the necessity.

The material that causes a change in hue or reflectance with heat is not particularly limited and may be appropriately selected depending on the intended purpose. For example, materials known in the art, such as a combination of an electron-donating dye precursor and an electron-accepting color developer used in thermosensitive paper in the art can be used. Moreover, the change of the material includes a complex reaction of heat and light, such as a discoloring reaction due to solid-phase polymerization of a diacetylene-based compound caused by heating and UV irradiation.

The electron-donating dye precursor is not particularly limited and may be appropriately selected from materials typically used for thermosensitive recording materials. Examples of the electron-donating dye precursor include leuco compounds of dyes, such as triphenyl methane-based dyes, fluoran-based dyes, phenothiazine-based dyes, auramine-based dyes, spiropyran-based dyes, and indophthalide-based dyes.

As the electron-accepting color developer, various electron-accepting compounds or oxidizers that can color the electron-donating dye precursor as contacted, can be used.

The photothermal conversion material can be roughly classified into inorganic materials and organic materials.

Examples of the inorganic materials include particles of at least one of carbon black, metal boride, and metal oxide of Ge, Bi, In, Te, Se, or Cr. Among the above-listed examples, a material that absorbs a large amount of light of a near infrared wavelength region and a small amount of light of a visible range wavelength region is preferable, and the metal boride and the metal oxide are more preferable. As the metal boride and the metal oxide, for example, at least one selected from the group consisting of hexaboride, a tungsten oxide compound, antimony tin oxide (ATO), indium tin oxide (ITO), and zinc antimonate is preferable.

Examples of the hexaboride include $LaB_6$, $CeB_6$, $PrB_6$, $NdB_6$, $GdB_6$, $TbB_6$, $DyB_6$, $HoB_6$, $YB_6$, $SmB_6$, $EuB_6$, $ErB_6$, $TmB_6$, $YbB_6$, $LuB_6$, $SrB_6$, $CaB_6$, and $(La, Ce)B_6$.

Examples of the tungsten oxide compound include particles of tungsten oxide represented by the general formula: $W_yO_z$ (where W is tungsten, O is oxygen, and $2.2 \leq z/y \leq 2.999$), and particles of composite tungsten oxide represented by the general formula: $M_xW_yO_z$ (where M is at least one element selected from the group consisting of H, He, alkali metal, alkaline earth metal, rare-earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, and $0.001 \leq x/y \leq 1$, $2.2 \leq z/y \leq 3.0$) as disclosed in WO2005/037932, and Japanese Unexamined Patent Application Publication No. 2005-187323. Among the above-listed examples, cesium-containing tungsten oxide is particularly preferable because absorption of light in the near infrared region is large and absorption of light in the visible region is small.

Among antimony tin oxide (ATO), indium tin oxide (ITO), and zinc antimonate, moreover, ITO is particularly preferable because absorption of light in the near infrared region is large and absorption of light in the visible region is small.

The above-listed materials may be formed into a layer by vacuum deposition or bonding a particular material with a resin.

As the organic materials, various dyes are appropriately used depending on a wavelength of light to be absorbed. In the case where a semiconductor laser is used as a light source, a near infrared absorbing dye having an absorption peak at from about 600 nm through about 1,200 nm is used. Specific examples of such a dye include cyanine dyes, quinone-based dyes, quinolone derivatives of indonaphthol, phenylene diamine-based nickel complexes, and phthalocyanine-based dyes.

The photothermal conversion material may be used alone or in combination.

The photothermal conversion material may be included in a thermosensitive coloring layer, or in a layer other than the thermosensitive coloring layer. In the case where the photothermal conversion material is included in a layer other than the thermosensitive coloring layer, a photothermal conversion layer is preferably disposed adjacent to the thermosensitive coloring layer. The photothermal conversion layer includes at least the photothermal conversion material and a binder resin.

Examples of the above-mentioned other ingredients include binder resins, thermoplastic materials, antioxidants, photostabilizers, surfactants, lubricants, and filler.

—Support—

A shape, structure, or size of the support is not particularly limited and may be appropriately selected depending on the intended purpose. Examples of the shape include a plate shape. The structure may be a single-layer structure or a laminate structure. The size can be appropriately selected depending on a size of the thermosensitive recording medium.

—Other Layers—

Examples of the above-mentioned other layers include a photothermal conversion layer, a protective layer, an under layer, a UV ray-absorbing layer, an oxygen-barrier layer, an intermediate layer, a backing layer, an adhesive layer, and a pressure-sensitive adhesive layer.

The thermosensitive recording medium can be processed into a desired shape depending on the intended use. Examples of the shape include a card shape, a tag shape, a label shape, a sheet shape, and a roll shape.

Examples of the thermosensitive recording medium processed into the card shape include pre-payed cards, point cards, and credit cards. The thermosensitive recording medium in the shape of the tag smaller than the card size can be used as a price tag. Moreover, the thermosensitive recording medium in the shape of the tag larger than the card size can be used for process control, shipping instructions, and thickets. Since the thermosensitive recording medium in the shape of the label can be bonded, such a thermosensitive recording medium can be processed into various sizes, and can be used for process control or goods management by bonding the thermosensitive recording medium to a dolly, container, box, or shipping container, which is repetitively used. Moreover, the thermosensitive recording medium having a sheet size lager than the card size has a large area where an image can be recorded, and therefore such a thermosensitive recording medium can be used for general documents, or instructions for process control.

The recording device of the present disclosure includes an optical fiber array, preferably includes an emitting unit, and may further include other units according to the necessity.

<Optical Fiber Array>

In the optical fiber array, a plurality of optical fibers are aligned along a main-scanning direction orthogonal to a sub-scanning direction that is a moving direction of a recording target. The emitting unit is configured to apply emitted laser light to the recording target via the optical fiber array to recode an image formed of writing units.

An alignment of the optical fibers is not particularly limited and may be appropriately selected depending on the intended purpose. Examples of the alignment include a linear alignment, and a planar alignment. Among the above-listed examples, the linear alignment is preferable.

A minimum distance (pitch) between centers of the optical fibers is preferably 1.0 mm or less, more preferably 0.5 mm or less, and even more preferably 0.03 mm or greater but 0.15 mm or less.

When the minimum distance (pitch) between centers of the optical fibers is 1.0 mm or less, high-resolution recording is enabled, and a high-definition image compared to images generally formed in the art can be realized.

The number of the optical fibers aligned in the optical fiber array is preferably 10 or greater, more preferably 50 or greater, and even more preferably 100 or greater but 400 or less.

When the number of the optical fibers aligned is 10 or greater, high-speed recording is enabled, and a high-definition image compared to images generally formed in the art can be realized.

An optical system, such as an optical system composed of lenses, can be disposed to follow the optical fiber array in order to control a spot diameter of the laser light.

An optical fiber array head, in which a plurality of the optical fiber arrays are disposed in lines along the main-scanning direction, may be formed depending on a size of the recording target in the main-scanning direction.

—Optical Fiber—

The optical fiber is an optical waveguide of laser light emitted from the emitting unit.

Examples of the optical fiber include optical fibers.

A shape, size (diameter), material, or structure of the optical fiber is not particularly limited and may be appropriately selected depending on the intended purpose.

A size (diameter) of the optical fiber is preferably 15 µm or greater but 1,000 µm or smaller, and more preferably 20 µm or greater but 800 µm or smaller. The optical fiber having a diameter of 15 µm or greater but 1,000 µm or smaller is advantageous in view of high image definition.

A material of the optical fiber is not particularly limited and may be appropriately selected depending on the intended purpose. Examples of the material include quartz, glass, and resins.

A transmission wavelength range of the material of the optical fiber is not particularly limited and may be appropriately selected depending on the intended purpose. The transmission wavelength range is preferably 700 nm or longer but 2,000 nm or shorter, and more preferably 780 nm or longer but 1,600 nm or shorter.

The structure of the optical fiber is preferably a structure including a core that is a center through which laser light is transmitted, and a cladding layer disposed at the periphery of the core.

A diameter of the core is not particularly limited and may be appropriately selected depending on the intended purpose. The diameter is preferably 10 µm or greater but 500 µm or less, and more preferably 15 µm or greater but 400 µm or less.

A material of the core is not particularly limited and may be appropriately selected depending on the intended purpose. Examples of the material include germanium-doped or phosphorus-doped glass.

An average thickness of the cladding layer is not particularly limited and may be appropriately selected depending on the intended purpose. The average thickness is preferably 10 µm or greater but 250 µm or less, and more preferably 15 µm or greater but 200 µm or less.

A material of the cladding layer is not particularly limited and may be appropriately selected depending on the intended purpose. Examples of the material include boron-doped or fluorine-doped glass.

<Emitting Unit>

The emitting unit is a unit configured to apply emitted laser light to the recording target via the optical fiber array.

The emitting unit can control a length of each writing unit along the sub-scanning direction with a cycle and duty ratio of an input pulse signal based on the pulse signal and a spot diameter of the laser light on the recording target, and can record with edges of the writing units adjacent to each other in the sub-scanning direction overlapping in the sub-scanning direction.

The emitting unit is not particularly limited and may be appropriately selected depending on the intended purpose. Examples of the emitting unit include a semiconductor laser, and a solid optical fiber laser. Among the above-listed examples, a semiconductor laser is preferable because the semiconductor laser has a wide wavelength selectivity, a size of a device of the semiconductor laser is small, and the semiconductor laser is low cost.

A wavelength of the laser light is not particularly limited and may be appropriately selected depending on the intended purpose. The wavelength is preferably 700 nm or longer but 2,000 nm or shorter, and more preferably 780 nm or longer but 1,600 nm or shorter.

An output of the laser light is not particularly limited and may be appropriately selected depending on the intended purpose. The output is preferably 1 W or greater, but more preferably 3 W or greater. When the output of the laser light is 1 W or greater, it is advantageous in view of high density of an image.

A shape of a spot writing unit of the laser light is not particularly limited and may be appropriately selected depending on the intended purpose. Examples of the shape include a circle, an oval, and various polygons, such as a triangle, a square, a pentagon, and a hexagon. Among the above-listed examples, a circle and an oval are preferable.

Figure 12:
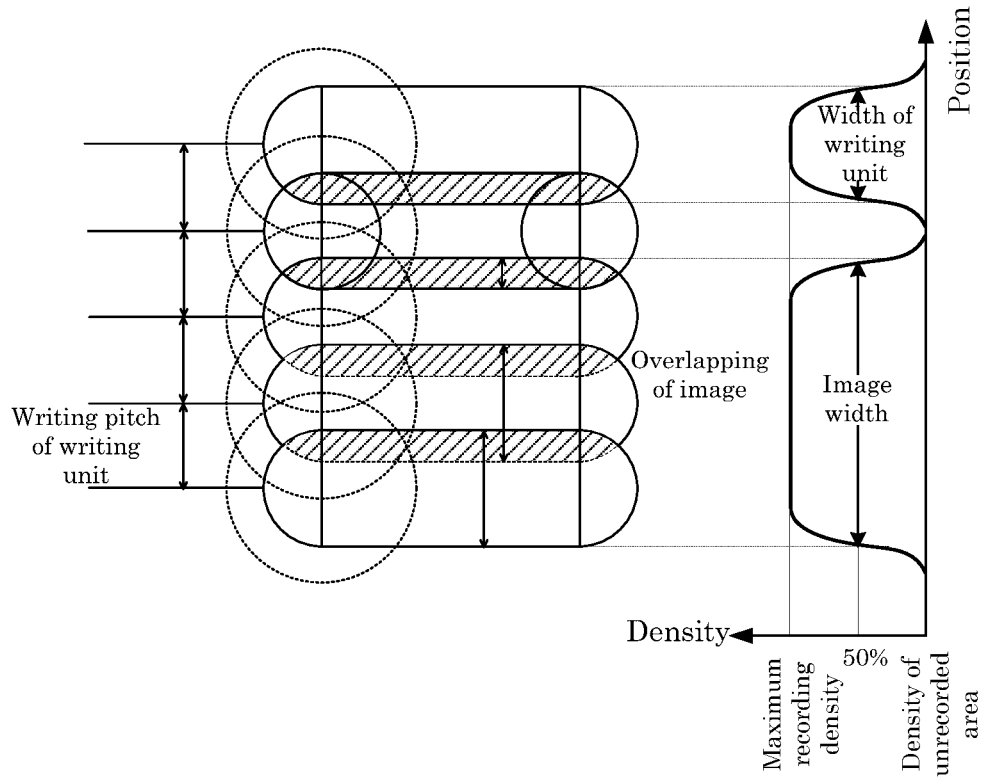
FIG. 12 is a view for explaining a definition of an oval of a writing unit.

A spot writing unit of the laser light being an oval means as follows. When a straight line is drawn on a recording target with a single beam of identical energy as illustrated in FIG. 12, ½ a line width is determined as B, a center of a left edge of the line is determined as A, points vertically crossing with the drawn straight line with the points moved from the starting point A of the line towards the center direction of the line width by the distance B are determined as L and L', and a cross point between a vertical line from the starting point A of the line and the line LL' is determined as A. When a distance A'C where C is a boundary of the drawn line that is in the 45° top-left direction from A is longer than B, the spot writing unit is an oval. Alternatively, when a distance A'D where D is a boundary of the drawn line that is in the 45° left-down direction from A is longer than B, the spot writing unit is an oval. The distance A'C and the distance A'D are almost identical, and the phrase "almost identical" means that a difference between the distances is in the range of ±10% or less.

A ling width can be determined from a result of a density distribution measurement of a writing unit. Typically, around a center of the writing unit has high recording density, and a peripheral area of the writing unit has low recording density. The line width of the writing unit along the main-scanning direction is determined by measuring a density profile of the writing unit along the main-scanning direction, determining a line of an area at which the density is 50% density of a density difference between the maximum recording density and an unrecorded area, as an outline, measuring 5 points at which a width of the outline is constant, and taking an average value of the measured value as a line width.

In the present specification, the maximum recording density means optical density of an area where an optical change caused by laser recording is the largest. The maximum recording density includes a case where the optical density is increased by laser recording compared to an unrecorded area, and also a case where the optical density is decreased by laser recording compared to an unrecorded area.

Figure 13:
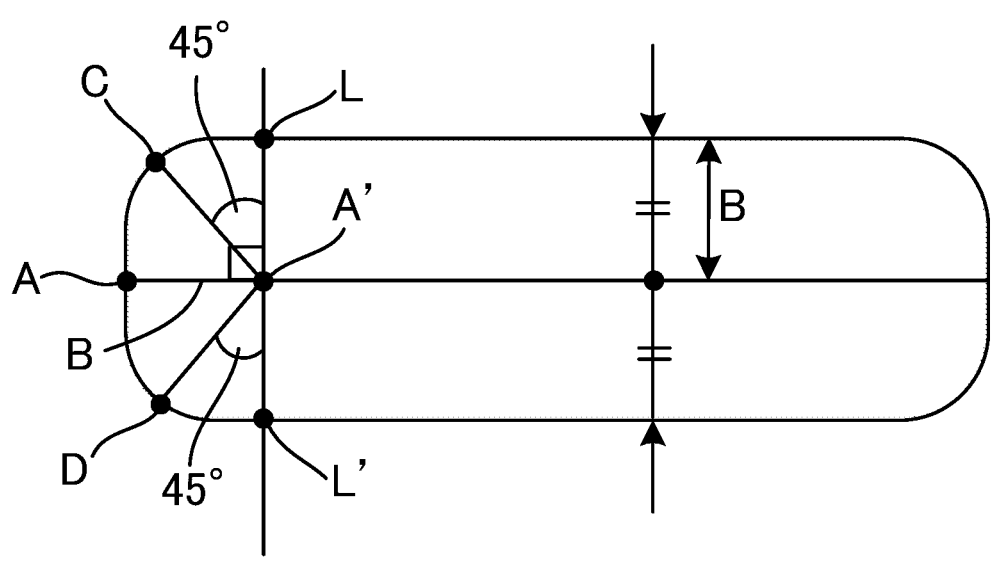
FIG. 13 is a schematic view illustrating definitions of a line width and an image.

As a device for measuring a density profile of a writing unit along the main-scanning unit, a microdensitometer (PDM-7, available from available from KONICA MINOLTA, INC.) can be used. Note that, the definitions of a line width of a writing unit is presented in FIG. 13.

A size (spot diameter) of the laser spot writing unit of the laser light is not particularly limited and may be appropriately selected depending on the intended purpose. The size is preferably 30 μm or greater but 5,000 μm or less.

The spot diameter is not particularly limited and may be appropriately selected depending on the intended purpose. For example, the spot diameter can be measured by means of a beam profiler.

Control of the laser is not particularly limited and may be appropriately selected depending on the intended purpose. The control may be pulse control or continuous control.

<Other Units>

Other units are not particularly limited and may be appropriately selected depending on the intended purpose. Examples of the above-mentioned other units include a driving unit, a controlling unit, a main-controlling unit, a cooling unit, a power-supplying unit, and a conveying unit.

—Driving Unit—

The driving unit is configured to output the pulse signal, which is generated based on a driving signal input from the controlling unit, to the emitting unit to drive the emitting unit.

The driving units are respectively disposed to a plurality of the emitting units, and are configured to independently drive the emitting units.

—Controlling Unit—

The controlling unit is configured to output a driving signal, which is generated based on image information transmitted from the main-controlling unit, to the driving unit to control the driving unit.

—Main-Controlling Unit—

The main-controlling unit includes a central processing unit (CPU) configured to control each operation of the recording device, and is configured to prosecute various processes based on a control program for controlling operation of the entire recording device of the present disclosure.

Examples of the main-controlling unit include a computer.

The main-controlling unit is coupled with the controlling unit in a manner that the main-controlling unit and the controlling unit can communicate, and the main-controlling unit transmits image information to the controlling unit.

—Cooling Unit—

The cooling unit is disposed near the driving unit and the controlling unit to cool the driving unit and the controlling unit. When a duty ratio of a pulse signal is high, time of laser oscillation is long, and therefore it becomes difficult to cool the driving unit and the controlling unit with the cooling unit. As a result, irradiation energy of laser light varies, and an image may not be able to record stably.

—Power-Supplying Unit—

The power-supplying unit is configured to supply power to the controlling unit.

—Conveying Unit—

The conveying unit is not particularly limited and may be appropriately selected depending on the intended purpose, as long as the conveying unit is capable of conveying the recording target in a sub-scanning direction. Examples of the conveying unit include a linear slider.

Conveying speed of the recording target by the conveying unit is not particularly limited and may be appropriately selected depending on the intended purpose. The conveying speed is preferably 10 mm/s or greater but 10,000 mm/s or less, and more preferably 100 mm/s or greater but 8,000 mm/s or less.

One example of the recording device of the present disclosure for use in the recording method of the present disclosure is described with reference to drawings.

Note that, identical reference numerals are provided to identical structural members in drawings, and duplicated descriptions may be omitted. Moreover, the number, positions, and shapes of the structural members below are not limited to the embodiment of the present disclosure, and the number, positions, and shapes suitable for carrying out the present disclosure can be selected.

Figure 1:
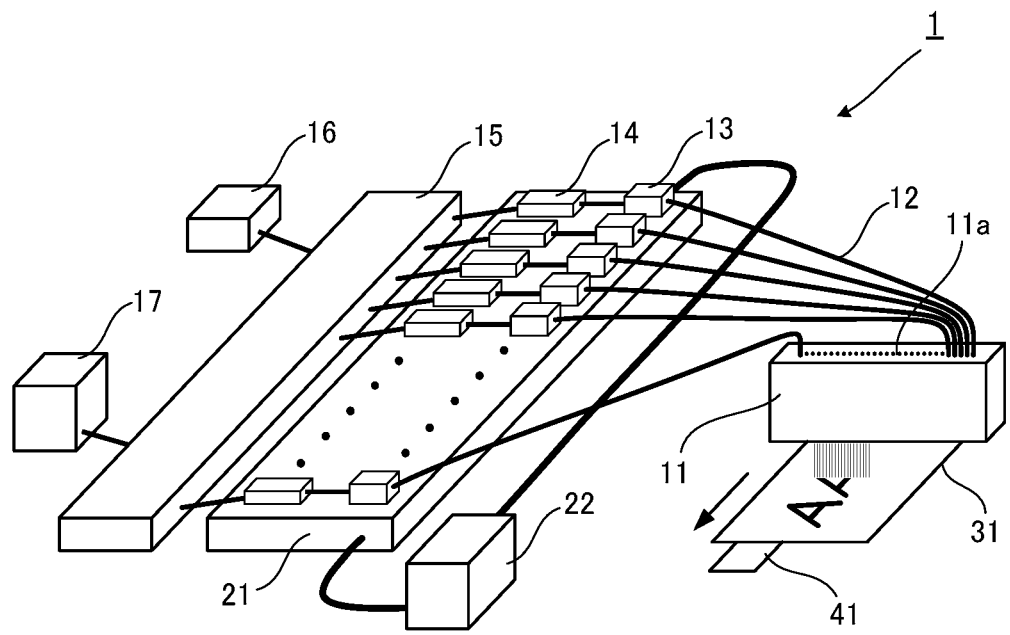
FIG. 1 is a schematic view illustrating one example of a recording device of the present disclosure including an optical fiber array.

FIG. 1 is a schematic view illustrating one example of the recording device of the present disclosure including an optical fiber array.

As illustrated in FIG. 1, the recording device 1 records an image formed of writing units using an optical fiber array 11, in which a plurality of optical fibers 12 in a main-scanning direction orthogonal to a subs-scanning direction that is a moving direction of a recording target 31 and is presented with an arrow in FIG. 1, and a plurality of emitting units 13 respectively coupled to the optical fibers 12 of the optical fiber array 11 in a manner that the emitting units can emit laser light to the optical fibers 12, by applying laser light from the optical fiber array 11 to a recording target 31 with conveying the recording target 31 in the sub-scanning direction.

The optical fiber array 11 is an array, in which one or a plurality of array heads 11a are linearly aligned along the main-scanning direction, and includes an optical system, which is capable of controlling a spot diameter of laser light and is not illustrated in FIG. 1, on a light path of laser light emitted from the array head 11a.

The emitting unit 13 generally generates heat because all of the energy applied to the emitting unit 13 is not turned into laser light, and the rest is turned into heat. Accordingly, the emitting unit 13 is cooled by the cooling unit 21. Use of an optical fiber array realizes to reduce an influence of emissions adjacent to each other because emitting units are disposed being apart from each other. Therefore, the emitting unit 13 can be efficiently cooled, and thus an increase or variation in temperature of the emitting unit 13 can be avoided, and a variation in output of laser light can be reduced. As a result, density unevenness and formation of white blank portions can be prevented.

The recording device 1 controls a length of the writing unit in the sub-scanning direction with a spot diameter of laser light to the recording target 31, and a cycle and duty ratio of a pulse signal input to the emitting unit 13 by the driving unit 14, to record with overlapping, in the sub-scanning direction, edges of the writing units adjacent to each other in the sub-scanning direction.

The emitting unit 13 is a semiconductor laser. A wavelength of laser light emitted from the emitting unit is 915 nm, and output of laser light of the emitting unit is 30 W.

The output of the laser light is average output measured by a power meter. As a controlling method of the output, the output can be controlled by controlling two elements, peak power and duty (=laser emission time/cycle time).

The driving unit 14 is configured to output a pulse signal, which is generated based on a driving signal input from the controlling unit 15, to the emitting unit 13 to drive the emitting unit 13.

The driving units 14 are respectively disposed to a plurality of the emitting units 13, and are configured to independently drive the emitting units 13.

The controlling unit 15 is configured to output a driving signal, which is generated based on image information transmitted from the main-controlling unit 16, to the driving unit 14 to control the driving unit 14.

The main-controlling unit 16 includes a central processing unit (CPU) configured to control each operation of the recording device 1, and is configured to prosecute various processes based on a control program for controlling operation of the entire recording device 1.

The main-controlling unit 16 is coupled to the controlling unit 15 in a manner that the main-controlling unit and the controlling unit can be communicate, and is configured to transmit image information to the controlling unit 15.

The power-supplying unit 17 is configured to supply power to the controlling unit 15.

The cooling unit 21 is disposed below the driving unit and the controlling unit, and is configured to cool the driving unit and the controlling unit using a liquid of a constant temperature circulated by a chiller 22.

Typically, only cooling is performed in a chiller system without performing heating. Therefore, a temperature of a light source never be higher than a set temperature of the chiller, but the temperature of the cooling unit and the temperature of the laser light source to be in contact with may vary depending on an environmental temperature. In the case where a semiconductor laser is used as a laser light source, meanwhile, output of laser varies depending on a temperature of the laser light source (the output of laser is high when the temperature of the laser light source is low). In order to control output of laser, a regular image formation is preferably formed by measuring a temperature of a laser light source or a temperature of a cooling unit, an input signal to a driving circuit configured to control output of the laser is controlled to make the laser output constant depending on the result of the measurement.

The conveying unit 41 is configured to convey the recording target 31 in the sub-scanning direction.

Figure 2:
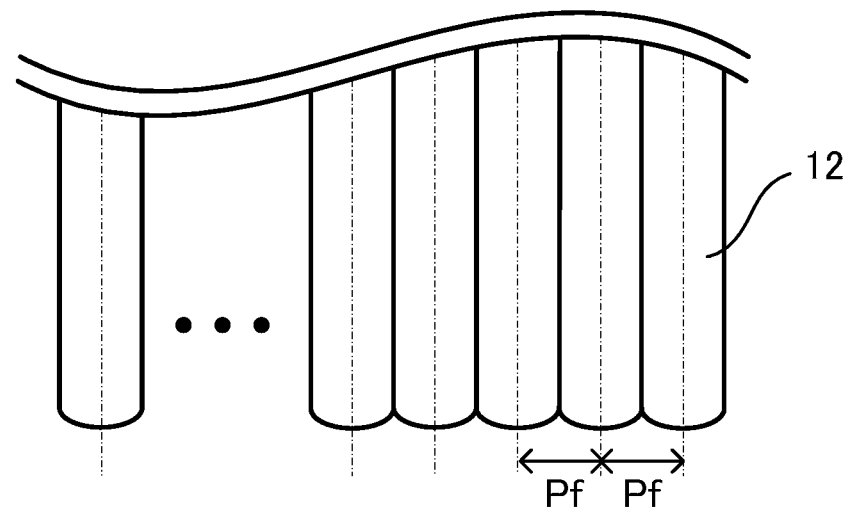
FIG. 2 is a partially-omitted enlarged view of the optical fiber array of FIG. 1.

FIG. 2 is an enlarged partial view of the array head 11a of FIG. 1.

The array head 11a includes a plurality of the optical fibers 12 linearly aligned along the main-scanning direction, and the pitch P of the optical fibers 12 is constant.

Figure 3:
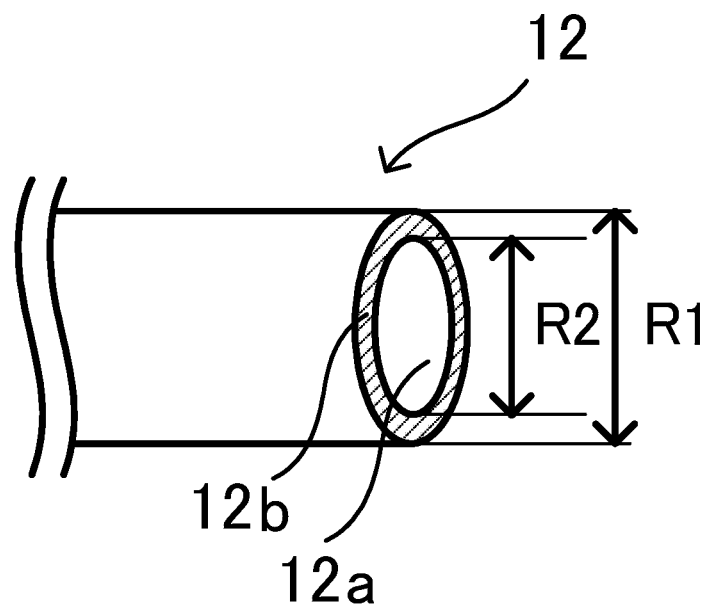
FIG. 3 is an enlarged partial view of the optical fiber of FIG. 2.

FIG. 3 is an enlarged partial view of the optical fiber of FIG. 2.

As illustrated in FIG. 3, the optical fiber 12 includes a core 12a that is a center through which laser light is transmitted, and a cladding layer 12b disposed at the periphery of the core 12a, and has a structure where a refractive index of the core 12a is higher than a refractive index of the cladding layer 12b so that laser light is transmitted only through the core 12a with total reflection or refraction.

A diameter R1 of the optical fiber 12 is 125 µm, and a diameter R2 of the core 12a is 105 µm.

FIGS. 4A to 4D are view illustrating examples of an arrangement of array heads. In FIGS. 4A to 4D, X represents a sub-scanning direction and Z represents a main-scanning direction.

Figure 4A:
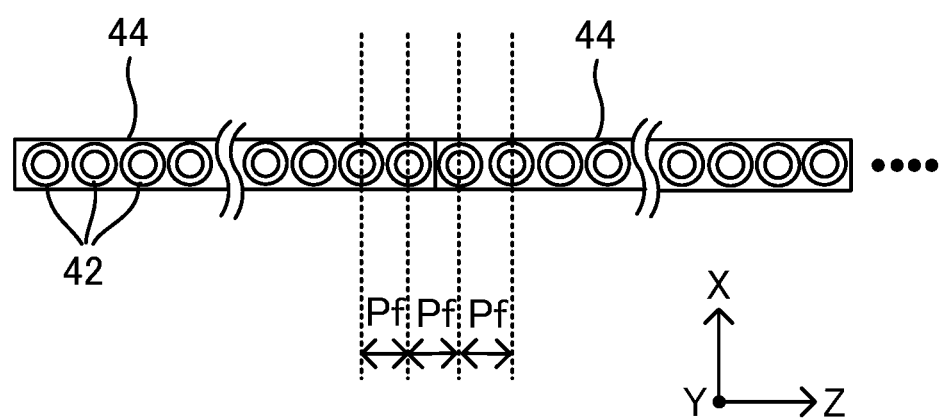
FIG. 4A is a view illustrating one example of an alignment state of the array head.
Figure 4B:
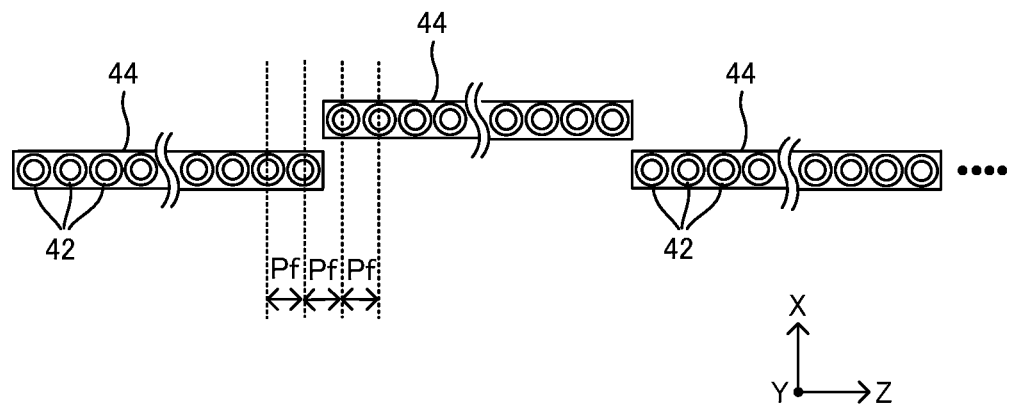
FIG. 4B is a view illustrating another example of an alignment state of the array head.

The optical fiber array 11 may be composed of one array head. In case of a long optical fiber array head, however, the array head itself is long and tends to be deformed. Therefore, it is difficult to maintain a straight line of arraignments of beams, or uniformity of pitches of the beams. Accordingly, a plurality of the array heads 44 may be arranged in arrays along a main-scanning direction (Z-axis direction), as illustrated in FIG. 4A, or may be arranged in a grid, as illustrated in FIG. 4B. In the example of the recording device including the optical fiber array according to the present disclosure illustrated in FIG. 1, one array head aligned along the main-scanning direction is mounted.

The grid arrangement of the array heads 44 as illustrated in FIG. 4B is more preferable than the linear arrangement in the main-scanning direction (Z-axis direction) as illustrated in FIG. 4A in view of easiness of assembly.

Figure 4C:
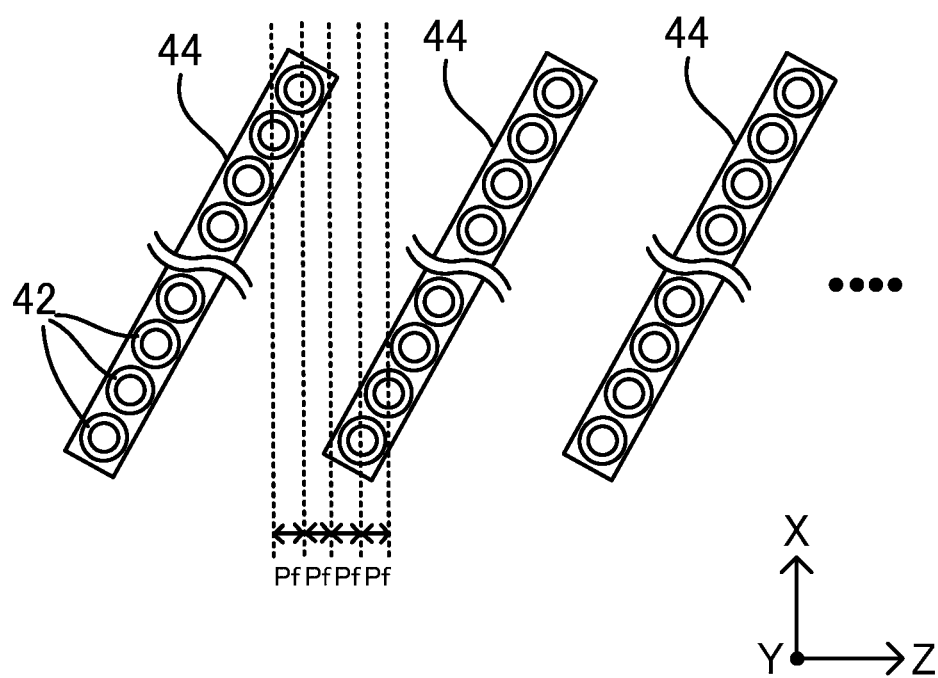
FIG. 4C is a view illustrating another example of an alignment state of the array head.

Moreover, the array heads 44 may be arranged with inclination along a sub-scanning direction. The array heads 44 may be arranged with inclination along the sub-scanning direction (X-axis direction), as illustrated in FIG. 4C. When the array heads 44 are arranged with inclination along the sub-scanning direction (X-axis direction) as illustrated in FIG. 4C, a pitch Pf of the optical fibers 42 in the main-scanning direction (Z-axis direction) can be narrowed compared to the arrangements illustrated in FIGS. 4A and 4B, to thereby achieve high resolution.

Figure 4D:
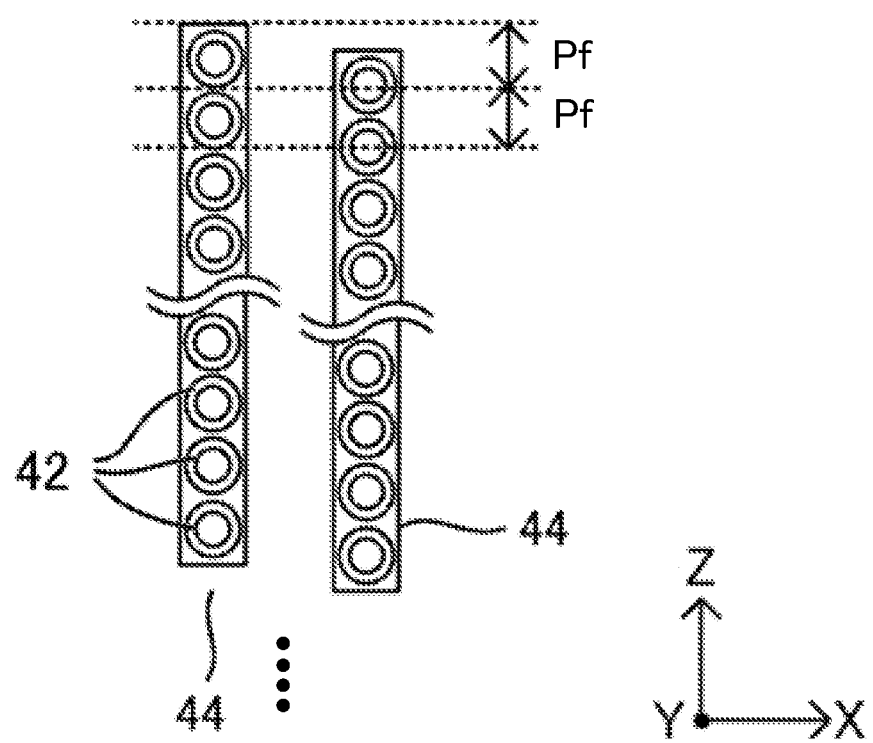
FIG. 4D is a view illustrating another example of an alignment state of the array head.

Moreover, the array heads 44 may be arranged with slightly sifting in the main-scanning direction (Z-axis direction), as illustrated in FIG. 4D. High resolution can be realized by arranging the array heads as illustrated in FIG. 4D.

EXAMPLES

The present disclosure will be described in more detail by way of the following Examples. However, the present disclosure should not be construed as being limited to these Examples.

Production Example 1

—Production of Thermosensitive Recording Medium—
(1) Preparation of Dye Dispersion Liquid (A Liquid)
The following composition was dispersed by a sand mill to prepare a dye dispersion liquid (A Liquid).

| | |
|---|---|
| 2-anilino-3-methyl-6-dibutylaminofluoran | 20 parts by mass |
| 10% by mass polyvinyl alcohol aqueous solution | 20 parts by mass |
| Water | 60 parts by mass |

(2) Preparation of B Liquid
The following composition was dispersed by means of a ball mill to prepare B Liquid.

| | |
|---|---|
| 4-hydroxy-4'-isopropoxydiphenylsulfone | 20 parts by mass |
| 10% by mass polyvinyl alcohol aqueous solution | 20 parts by mass |
| Water | 60 parts by mass |

(3) Preparation of C Liquid
The following composition was dispersed by means of a ball mill to prepare C Liquid.

| | |
|---|---|
| Photothermal conversion material (indium tin oxide (ITO)) | 20 parts by mass |
| Polyvinyl alcohol aqueous solution (solid content: 10% by mass) | 20 parts by mass |
| Water | 60 parts by mass |

(4) Preparation of Thermosensitive Coloring Layer Coating Liquid
The following composition was mixed to prepare a thermosensitive coloring layer coating liquid.

| | |
|---|---|
| A Liquid above | 20 parts by mass |
| B Liquid above | 40 parts by mass |
| C Liquid above | 2 parts by mass |
| Polyvinyl alcohol aqueous solution (solid content: 10% by mass) | 30 parts by mass |
| Dioctyl sulfosuccinate aqueous solution (solid content: 5% by mass) | 1 part by mass |

Next, wood-free paper having a basis weight of 60 g/m$^2$ was used as a support. Onto the wood-free paper, the thermosensitive coloring layer coating liquid was applied in a manner that a dry deposition amount of the dye contained in the thermosensitive coloring layer coating liquid was to be 0.5 g/m$^2$, followed by drying to thereby form a thermosensitive coloring layer. As described above, a thermosensitive recording medium as a recording target was produced.

Examples 1 to 18 and Comparative Examples 1 to 5

By means of a recording device illustrated in FIGS. 1 to 3, 100 writing units in the size presented in Table 1 were continuously recorded with fixing a spot diameter to 140 μm by adjusting a focus position, and varying electric current applied to a semiconductor laser serving as an emitting unit, and a cycle and duty ratio of the pulse signal, under the conditions that a moving speed relative to the recording target was 2 m/sec. As a recording medium, the thermosensitive recording medium of Production Example 1 was used.

The recording device illustrated in FIGS. 1 to 3 had 32 fiber-coupling LDs each having a maximum output of 30 W as the emitting unit. As the optical fiber array, 32 optical fibers (diameter of the optical fiber: 125 μm, diameter of the core: 105 μm) were aligned in the main-scanning direction, and a pitch X between adjacent optical fibers was 127 μm. The peak power of the laser light was 5 W.

<Image Size>
The image was confirmed by scanning the image by a microdensitometer (PDM-7, available from KONICA MINOLTA, INC.) and magnifying the image 100 times by means of a digital microscope (VHX-1000, available from KEYENCE CORPORATION), and evaluated based on the following criteria. A gap between the peak positions in the swells of the writing units was measured to determine a writing pitch P of the writing units in the main-scanning direction. Next, a width of the image in the main-scanning direction was measured. In the image, writing units adjacent to each other were overlapped in the main-scanning direction. From the value of the width, a value obtained by multiplying the writing pitch P of the writing units in the main-scanning direction with the number of the writing units was deducted, to determine an overlapped width E of the writing units in the main-scanning direction. Moreover, the overlapped width E of the writing units in the main-scanning direction was added with the writing pitch P of the writing units in the main-scanning direction to determine a width E of the writing units in the main-scanning direction.

<Continuity in Sub-Scanning Direction>

The obtained image was visually observed and was evaluated based on the following criteria. The results are presented in Table 2.

[Evaluation Criteria]

Good: The writing units were observed as a continuous line in the sub-scanning direction.

Poor: The writing units were observed as a discontinuous dashed line in the sub-scanning direction.

<Evaluation on White Blank Portions>

The degree of white blank portions from the image and shapes of the white blank portions were visually observed, and were evaluated based on the following criteria. The results are presented in Table 2.

—Degree of White Blank Portions—

[Evaluation Criteria]

5: There was no density unevenness or white blank portion.
4: The density unevenness was slightly observed but not observed as white blank portions.
3: Fine white blank positions were observed when the image was closely observed.
2: White blank portions were easily visually observed.
1: White mixing portions were more clearly observed than 2.

—Shapes of White Blank Portions—

[Evaluation Criteria]

NA: No white blank portion.
Rhombus: A rhombus-shaped white blank portion was observed at the edge of the writing unit in the sub-scanning direction.
Streak: A streaky white blank portion parallel to the main-scanning direction was observed at the edge of the writing unit in the sub-scanning direction.
Grid: A streaky white blank portion parallel to the main-scanning direction was observed at the edge of the writing unit in the sub-scanning direction, a streaky white blank portion parallel to the scanning direction at the edge of the writing unit in the sub-scanning direction, and therefore grid-state white blank portions were observed.

<Evaluation of Image Resolution>

Swell of the obtained image was visually observed, and was evaluated based on the following criteria. The results are presented in Table 2.

[Evaluation Criteria]

Excellent: Swell of the image was hardly recognized when the image was closely observed.

Good: Swell of the image was slightly recognized when the image was closely observed, but the swell was hardly recognized by typical observation.

Poor: Swell of the image was recognized by typical observation.

<Heat Generation Evaluation>

A temperature of a surface of a cooling jacket of each emitting unit during recording was measured by a non-contact thermometer (FT3700, available from HIOKI E.E. CORPORATION), and was evaluated based on the following criteria. The results are presented in Table 2.

[Evaluation Criteria]

Excellent: There was no temperature increase.

Good: The temperature increase was less than 5° C.

Poor: The temperature increase was 5° C. or greater but less than 10° C.

Very poor: The temperature increase was 10° C. or greater.

TABLE 1

| | | Laser irradiation conditions | | | Image printing results | | | |
|---|---|---|---|---|---|---|---|---|
| | | Time per cycle of pulse signal T µsec | Laser light irradiation time W µsec | Duty ratio of pulse signal D = W/T NA | Max. length of swell of writing unit in sub-scanning direction C µm | Max. length of writing unit in sub-scanning direction A µm | Width of writing unit in main-scanning direction F µm | Overlapped width of image in main-scanning direction E µm |
| Example | 1 | 250 | 140 | 0.56 | 260 | 520 | 258 | 128 |
| | 2 | 245 | 140 | 0.57 | 260 | 520 | 258 | 128 |
| | 3 | 215 | 140 | 0.65 | 260 | 520 | 258 | 128 |
| | 4 | 195 | 140 | 0.72 | 260 | 520 | 258 | 128 |
| | 5 | 144 | 135 | 0.94 | 260 | 520 | 258 | 128 |
| | 6 | 140 | 135 | 0.96 | 260 | 520 | 258 | 128 |
| | 7 | 145 | 135 | 0.93 | 161 | 421 | 160 | 30 |
| | 8 | 145 | 118 | 0.81 | 200 | 420 | 198 | 68 |
| | 9 | 140 | 110 | 0.79 | 260 | 460 | 258 | 128 |
| | 10 | 140 | 60 | 0.43 | 260 | 360 | 258 | 128 |
| | 11 | 140 | 35 | 0.25 | 260 | 310 | 258 | 128 |
| | 12 | 245 | 140 | 0.57 | 260 | 520 | 258 | 128 |
| | 13 | 135 | 35 | 0.26 | 260 | 310 | 258 | 128 |
| | 14 | 150 | 148 | 0.98 | 260 | 560 | 258 | 128 |
| | 15 | 250 | 140 | 0.56 | 280 | 540 | 279 | 149 |
| | 16 | 140 | 35 | 0.25 | 300 | 350 | 302 | 172 |
| | 17 | 140 | 35 | 0.25 | 270 | 320 | 268 | 138 |
| | 18 | 265 | 260 | 0.98 | 260 | 780 | 258 | 128 |
| Comp. Ex. | 1 | 300 | 300 | 1.00 | 260 | 860 | 258 | 128 |
| | 2 | 200 | 80 | 0.40 | 260 | 400 | 258 | 128 |
| | 3 | 200 | 75 | 0.38 | 260 | 390 | 258 | 128 |

TABLE 1-continued

| | Laser irradiation conditions | | | Image printing results | | | |
|---|---|---|---|---|---|---|---|
| | Time per cycle of pulse signal T μsec | Laser light irradiation time W μsec | Duty ratio of pulse signal D = W/T NA | Max. length of swell of writing unit in sub-scanning direction C μm | Max. length of writing unit in sub-scanning direction A μm | Width of writing unit in main-scanning direction F μm | Overlapped width of image in main-scanning direction E μm |
| 4 | 250 | 60 | 0.24 | 300 | 400 | 302 | 172 |
| 5 | 150 | 100 | 0.67 | 120 | 300 | 115 | −15 |

TABLE 2

| | | Value of Formula 1 | Value of Formula 2 | Value of Formula 3 | P | Value of Formula 4 | 3F |
|---|---|---|---|---|---|---|---|
| Example | 1 | 20 | 0.08 | 104.2 | 130 | 520 | 774 |
| | 2 | 30 | 0.12 | 126.3 | 130 | 520 | 774 |
| | 3 | 90 | 0.35 | 205 | 130 | 520 | 774 |
| | 4 | 130 | 0.5 | 234.6 | 130 | 520 | 774 |
| | 5 | 233 | 0.9 | 269.4 | 130 | 520 | 774 |
| | 6 | 240 | 0.92 | 270.1 | 130 | 520 | 774 |
| | 7 | 131 | 0.81 | 165.1 | 130 | 421 | 480 |
| | 8 | 130 | 0.65 | 194.8 | 130 | 420 | 594 |
| | 9 | 180 | 0.69 | 257.8 | 130 | 460 | 774 |
| | 10 | 80 | 0.31 | 195.5 | 130 | 360 | 774 |
| | 11 | 30 | 0.12 | 126.3 | 130 | 310 | 774 |
| | 12 | 30 | 0.12 | 126.3 | 130 | 520 | 774 |
| | 13 | 40 | 0.15 | 144.4 | 130 | 310 | 774 |
| | 14 | 255 | 0.98 | 270.8 | 130 | 555 | 774 |
| | 15 | 40 | 0.14 | 150.9 | 130 | 540 | 837 |
| | 16 | 70 | 0.23 | 203.6 | 130 | 350 | 906 |
| | 17 | 40 | 0.15 | 147.4 | 130 | 320 | 804 |
| | 18 | 250 | 0.96 | 270.7 | 130 | 780 | 774 |
| Comp. Ex. | 1 | 260 | 1 | 270.9 | 130 | 860 | 774 |
| | 2 | 0 | 0 | 0 | 130 | 400 | 774 |
| | 3 | −10 | −0.04 | NA | 130 | 390 | 774 |
| | 4 | −100 | −0.33 | NA | 130 | 400 | 906 |
| | 5 | 0 | 0 | 0 | 130 | 300 | 345 |

| | | Continuity in sub-scanning direction | Degree of white blank portions | Shapes of white blank portions | Image resolution | Heat generation |
|---|---|---|---|---|---|---|
| Example | 1 | Good | 3 | Rhombus | Good | Excellent |
| | 2 | Good | 4 | Rhombus | Good | Excellent |
| | 3 | Good | 5 | Rhombus | Good | Excellent |
| | 4 | Good | 5 | NA | Good | Excellent |
| | 5 | Good | 5 | NA | Good | Good |
| | 6 | Good | 5 | NA | Good | Good |
| | 7 | Good | 5 | NA | Excellent | Good |
| | 8 | Good | 5 | NA | Excellent | Good |
| | 9 | Good | 5 | NA | Good | Good |
| | 10 | Good | 5 | NA | Good | Excellent |
| | 11 | Good | 4 | NA | Good | Excellent |
| | 12 | Good | 4 | Rhombus | Good | Excellent |
| | 13 | Good | 5 | NA | Good | Excellent |
| | 14 | Good | 5 | NA | Good | Poor |
| | 15 | Good | 5 | NA | Poor | Excellent |
| | 16 | Good | 5 | NA | Poor | Excellent |
| | 17 | Good | 5 | NA | Good | Excellent |
| | 18 | Good | 5 | NA | Good | Poor |
| Comp. Ex. | 1 | Good | 5 | NA | Good | Very poor |
| | 2 | Poor | 2 | Streak | Excellent | Excellent |
| | 3 | Poor | 1 | Streak | Excellent | Excellent |
| | 4 | Poor | 1 | Streak | Poor | Excellent |
| | 5 | Poor | 1 | Grid | Excellent | Excellent |

For example, embodiments of the present disclosure are as follows.

<1> A recording method including:
emitting laser light from an optical fiber array to record an image formed of writing units with moving a recording target and the optical fiber array relatively using a recording device including a plurality of laser light-emitting elements and an emitting unit including the optical fiber array, in which a plurality of optical fibers configured to guide laser light emitted from the laser light-emitting elements are aligned, wherein a maximum length of the writing unit along a sub-scanning direction is controlled with set values of a duty ratio and a cycle of a pulse signal input to the emitting unit; recording energy applied to the recording target; and a spot diameter of the laser light, to record with overlapping an edge of the writing unit with an edge of the adjacent writing unit in the sub-scanning direction.

<2> The recording method according to <1>, wherein the writing units constituting the image satisfy a relationship represented by Mathematical Formula 1 below:

$$0 < C - (1-D)T \cdot Vs \qquad \text{Mathematical Formula 1}$$

where, in Mathematical Formula 1, C is a maximum length of a swell of a writing unit in the sub-scanning direction relative to a distance L along which the laser light is emitted, D is a duty ratio of the pulse signal, T is a cycle of the pulse signal, and Vs is a traveling speed of the recording target relative to the optical fiber array.

<3> The recording method according to <1> or <2>, wherein the writing units constituting the image satisfy a relationship represented by Mathematical Formula 2 below:

$$0.1 < 1 - (1-D)T \cdot Vs/C < 0.9 \qquad \text{Mathematical Formula 2}$$

where, in Mathematical Formula 2, D, T, Vs, and C are identical to D, T, Vs, and C of Mathematical Formula 1.

<4> The recording method according to any one of <1> to <3>, wherein the writing units constituting the image satisfy a relationship represented by Mathematical Formula 3 below:

$$0.95 \cdot F \cdot (2 \times (1-(1-D)T \cdot Vs/C) - (1-(1-D)T \cdot Vs/C)^2)^{1/2} \geq P \qquad \text{Mathematical Formula 3}$$

where, in Mathematical Formula 3, P is a recording pitch of the writing units in a main-scanning direction, F is a width of the writing unit in the main-scanning direction, and D, T, Vs, and C are identical to D, T, Vs, and C of Mathematical Formula 1.

<5> The recording method according to any one of <1> to <4>, wherein the writing units constituting the image satisfy a relationship represented by Mathematical Formula 4 below:

$$Vs \cdot DT + C \leq 3F \qquad \text{Mathematical Formula 4}$$

where, in Mathematical Formula 4, D, T, Vs, and C are identical to D, T, Vs, and C of Mathematical Formula 1, and F is identical to F of Mathematical Formula 3.

<6> The recording method according to any one of <1> to <5>, wherein a duty ratio of the pulse signal of a first cycle at the beginning of recording is larger than a duty ratio of the pulse signal of a second cycle or later.

<7> The recording method according to any one of <1> to <6>, wherein a duty ratio of the pulse signal of a first cycle at the beginning of recording is 105% or greater but 125% or less relative to a duty ratio of the pulse signal of a second cycle or later.

<8> The recording method according to any one of <1> to <7>, wherein a minimum distance between centers of the optical fibers is 1.0 mm or less.

<9> The recording method according to any one of <1> to <8>, wherein the number of optical fibers aligned in the optical fiber array is 10 or greater.

<10> The recording method according to any one of <1> to <9>, wherein the recording target is a thermosensitive recording medium, or a structure including a thermosensitive recording area, or both.

<11> A recording device including:
a plurality of laser light-emitting elements; and
an emitting unit including an optical fiber array, in which a plurality of optical fibers configured to guide laser light emitted from the laser light-emitting elements are aligned, wherein the recording device is configured to apply laser light emitted from the optical fiber array with moving a recording target and the optical fiber array relatively, to record an image formed of writing units, wherein a maximum length of the writing unit along a sub-scanning direction is controlled with set values of a duty ratio and a cycle of a pulse signal input to the emitting unit; recording energy applied to the recording target; and a spot diameter of the laser light, to record with overlapping an edge of the writing unit with an edge of the adjacent writing unit in the sub-scanning direction.

<12> The recording device according to <11>, wherein the writing units constituting the image satisfy a relationship represented by Mathematical Formula 1 below:

$$0 < C - (1-D)T \cdot Vs \qquad \text{Mathematical Formula 1}$$

where, in Mathematical Formula 1, C is a maximum length of a swell of a writing unit in the sub-scanning direction relative to a distance L with which the laser light is emitted, D is a duty ratio of the pulse signal, T is a cycle of the pulse signal, and Vs is a traveling speed of the recording target relative to the optical fiber array.

<13> The recording device according to <11> or <12>, wherein the writing units constituting the image satisfy a relationship represented by Mathematical Formula 2 below:

$$0.1 < 1 - (1-D)T \cdot Vs/C < 0.9 \qquad \text{Mathematical Formula 2}$$

where, in Mathematical Formula 2, D, T, Vs, and C are identical to D, T, Vs, and C of Mathematical Formula 1.

<14> The recording device according to any one of <11> to <13>, wherein the writing units constituting the image satisfy a relationship represented by Mathematical Formula 3 below:

$$0.95 \cdot F \cdot (2 \times (1-(1-D)T \cdot Vs/C) - (1-(1-D)T \cdot Vs/C)^2)^{1/2} \geq P \qquad \text{Mathematical Formula 3}$$

where, in Mathematical Formula 3, P is a recording pitch of the writing units in a main-scanning direction, F is a width of the writing unit in the main-scanning direction, and D, T, Vs, and C are identical to D, T, Vs, and C of Mathematical Formula 1.

<15> The recording device according to any one of <11> to <14>, wherein the writing units constituting the image satisfy a relationship represented by Mathematical Formula 4 below:

$$Vs \cdot DT + C \leq 3F \qquad \text{Mathematical Formula 4}$$

where, in Mathematical Formula 4, D, T, Vs, and C are identical to D, T, Vs, and C of Mathematical Formula 1, and F is identical to F of Mathematical Formula 3.

<16> The recording device according to any one of <11> to <15>, wherein a duty ratio of the pulse signal of a first cycle at the beginning of recording is larger than a duty ratio of the pulse signal of a second cycle or later.

<17> The recording device according to any one of <11> to <16>, wherein a duty ratio of the pulse signal of a first cycle at the beginning of recording is 105% or greater but 125% or less relative to a duty ratio of the pulse signal of a second cycle or later.

<18> The recording device according to any one of <11> to <17>, wherein a minimum distance between centers of the optical fibers is 1.0 mm or less.

<19> The recording device according to any one of <11> to <18>, wherein the number of optical fibers aligned in the optical fiber array is 10 or greater.

<20> The recording device according to any one of <11> to <19>, wherein irradiation power of the laser light is controlled depending on a temperature of the laser light-emitting element.

<21> The recording device according to any one of <11> to <20>, wherein the recording target is a thermosensitive recording medium, or a structure including a thermosensitive recording area, or both.

<22> The recording device according to any one of <11> to <21>, further including a recording target-conveying unit configured to convey the recording target,
wherein laser light is applied to the recording target with conveying the recording target by the recording target-conveying unit.

The recording method according any one of <1> to <10> and the recording device according to any one of <11> to <22> can solve the above-described various problems existing in the art, and achieve the object of the present disclosure.

What is claimed is:
1. A recording method comprising:
emitting laser light from an optical fiber array to record an image formed of writing units with moving a recording target and the optical fiber array relatively using a recording device including a plurality of laser light-emitting elements and an emitting unit including the optical fiber array, in which a plurality of optical fibers configured to guide laser light emitted from the laser light-emitting elements are aligned,
wherein a maximum length of the writing unit along a sub-scanning direction is controlled with set values of: a duty ratio and a cycle of a pulse signal input to the emitting unit; recording energy applied to the recording target; and a spot diameter of the laser light, to record with overlapping an edge of the writing unit with an edge of the adjacent writing unit in the sub-scanning direction, and
wherein the writing units constituting the image satisfy a relationship represented by Mathematical Formula 1 below:

$$0 < C - (1-D)T \cdot Vs \qquad \text{Mathematical Formula 1}$$

where, in Mathematical Formula 1, C is a maximum length of a swell of a writing unit in the sub-scanning direction relative to a distance L with which the laser light is emitted, D is a duty ratio of the pulse signal, T is a cycle of the pulse signal, and Vs is a traveling speed of the recording target relative to the optical fiber array.

2. The recording method according to claim 1, wherein the writing units constituting the image satisfy a relationship represented by Mathematical Formula 2 below:

$$0.1 < 1-(1-D)T \cdot Vs/C < 0.9 \quad \text{Mathematical Formula 2.}$$

3. The recording method according to claim 1, wherein the writing units constituting the image satisfy a relationship represented by Mathematical Formula 3 below:

$$0.95 \cdot F \cdot (2 \times (1-(1-D)T \cdot Vs/C) - (1-(1-D)T \cdot Vs/C)^2)^{1/2} \geq P \quad \text{Mathematical Formula 3}$$

where, in Mathematical Formula 3, P is a recording pitch of the writing units in a main-scanning direction, and F is a width of the writing unit in the main-scanning direction.

4. The recording method according to claim 1, wherein the writing units constituting the image satisfy a relationship represented by Mathematical Formula 4 below:

$$Vs \cdot DT + C \leq 3F \quad \text{Mathematical Formula 4}$$

where, in Mathematical Formula 4, F is a width of the writing unit in the main-scanning direction.

5. The recording method according to claim 1, wherein a duty ratio of the pulse signal of a first cycle at the beginning of recording is larger than a duty ratio of the pulse signal of a second cycle or later.

6. The recording method according to claim 1, wherein a duty ratio of the pulse signal of a first cycle at the beginning of recording is 105% or greater but 125% or less relative to a duty ratio of the pulse signal of a second cycle or later.

7. The recording method according to claim 1, wherein the recording target is a thermosensitive recording medium, or a structure including a thermosensitive recording area, or both.

8. A recording device comprising:
a plurality of laser light-emitting elements; and
an emitting unit including an optical fiber array, in which a plurality of optical fibers configured to guide laser light emitted from the laser light-emitting elements are aligned,
wherein the recording device is configured to apply laser light emitted from the optical fiber array with moving a recording target and the optical fiber array relatively, to record an image formed of writing units,
wherein a maximum length of the writing unit along a sub-scanning direction is controlled with set values of: a duty ratio and a cycle of a pulse signal input to the emitting unit; recording energy applied to the recording target; and a spot diameter of the laser light, to record with overlapping an edge of the writing unit with an edge of the adjacent writing unit in the sub-scanning direction, and
wherein the writing units constituting the image satisfy a relationship represented by Mathematical Formula 1 below:

$$0 < C-(1-D)T \cdot Vs \quad \text{Mathematical Formula 1}$$

where, in Mathematical Formula 1, C is a maximum length of a swell of a writing unit in the sub-scanning direction relative to a distance L with which the laser light is emitted, D is a duty ratio of the pulse signal, T is a cycle of the pulse signal, and Vs is a traveling speed of the recording target relative to the optical fiber array.

9. The recording device according to claim 8, wherein the writing units constituting the image satisfy a relationship represented by Mathematical Formula 2 below:

$$0.1 < 1-(1-D)T \cdot Vs/C < 0.9 \quad \text{Mathematical Formula 2.}$$

10. The recording device according to claim 8, wherein the writing units constituting the image satisfy a relationship represented by Mathematical Formula 3 below:

$$0.95 \cdot F \cdot (2 \times (1-(1-D)T \cdot Vs/C) - (1-(1-D)T \cdot Vs/C)^2)^{1/2} \geq P \quad \text{Mathematical Formula 3}$$

where, in Mathematical Formula 3, P is a recording pitch of the writing units in a main-scanning direction, and F is a width of the writing unit in the main-scanning direction.

11. The recording device according to claim 8, wherein the writing units constituting the image satisfy a relationship represented by Mathematical Formula 4 below:

$$Vs \cdot DT + C \leq 3F \quad \text{Mathematical Formula 4}$$

where, in Mathematical Formula 4, F is a width of the writing unit in the main-scanning direction.

12. The recording device according to claim 8, wherein a duty ratio of the pulse signal of a first cycle at the beginning of recording is larger than a duty ratio of the pulse signal of a second cycle or later.

13. The recording device according to claim 8, wherein a duty ratio of the pulse signal of a first cycle at the beginning of recording is 105% or greater but 125% or less relative to a duty ratio of the pulse signal of a second cycle or later.

14. The recording device according to claim 8, wherein a minimum distance between centers of the optical fibers is 1.0 mm or less.

15. The recording device according to claim 8, wherein the number of optical fibers aligned in the optical fiber array is 10 or greater.

16. The recording device according to claim 8, wherein irradiation power of the laser light is controlled depending on a temperature of the laser light-emitting element.

17. The recording device according to claim 8, wherein the recording target is a thermosensitive recording medium, or a structure including a thermosensitive recording area, or both.

18. The recording device according to claim 8, further comprising a recording target-conveying unit configured to convey the recording target,
wherein laser light is applied to the recording target with conveying the recording target by the recording target-conveying unit.

* * * * *